United States Patent [19]

Dwyer, III

[11] Patent Number: 5,030,986
[45] Date of Patent: Jul. 9, 1991

[54] FILM PRINTING AND READING SYSTEM

[75] Inventor: Eugene J. Dwyer, III, New York, N.Y.

[73] Assignee: Silhouette Technology, Inc., Morristown, N.J.

[21] Appl. No.: 520,713

[22] Filed: May 8, 1990

Related U.S. Application Data

[63] Continuation-in-part of Ser. No. 347,247, May 4, 1989, Pat. No. 4,924,254, and a continuation-in-part of Ser. No. 348,551, May 8, 1989.

[51] Int. Cl.$^5$ .................. G03B 27/72; G03B 27/80
[52] U.S. Cl. ......................... 355/20; 355/81; 358/51
[58] Field of Search ................ 355/20, 81; 358/51

[56] References Cited

U.S. PATENT DOCUMENTS

| | | | |
|---|---|---|---|
| 3,115,807 | 12/1963 | Craig et al. | 355/20 |
| 3,183,766 | 5/1965 | Takasaka et al. | 355/20 |
| 3,404,220 | 10/1968 | Favreau | 358/51 |
| 4,265,532 | 5/1981 | McIntosh | 355/20 |
| 4,371,259 | 2/1983 | Howitt | 355/38 |
| 4,457,618 | 7/1984 | Plummer | 355/20 |
| 4,630,115 | 12/1986 | Hilsum | 358/139 |

Primary Examiner—Monroe H. Hayes
Attorney, Agent, or Firm—Antonelli, Terry, Stout & Kraus

[57] ABSTRACT

The invention is an improved apparatus for recording an image onto a light recording medium by sequentially recording a plurality of sections onto the light recording medium which constitute the image and further an apparatus for reading previously recorded information disposed on a recording medium (162). The invention utilizes a light position sensor (201) having a target area having a plurality of apertures (604) including at least one line segment coupled to light emitted from a plurality of positions within the light emitting area (120) of the light source (120) used for recording for detecting the position of the light intersecting the target area (201) of the sensor from the light emitting area of the light source and generating at least one signal dependent upon the light intersecting the target area. A controller (13) responsive to the at least one signal, produces at least one correction parameter, sequentially controls the recording and reading of sections (F1-FN) to record or read the image by controlling the position of the light on a light emitting area of the light source as a function of the at least one correction parameter during the recording or reading of each section to cause the light to move to coordinates on the light emitting area of the light source to cause the light to intersect the recording medium at the recording or recorded position coordinates and controls the position of the translator for recording or reading each section.

71 Claims, 11 Drawing Sheets

POWER SERIES EXPANSION ALGORITHM $$x' = a(0) + a(1)*x + a(2)*y + a(3)*x*x + a(4)*x*y + a(5)*y*y + a(6)*x*r + a(7)*y*r$$

$$y' = b(0) + b(1)*x + b(2)*y + b(3)*x*x + b(4)*x*y + b(5)*y*y + b(6)*x*r + b(7)*y*r$$

WHERE:  $r = \sqrt{x*x + y*y}$
$(x', y')$ = CRT COORDINATES OR CRT DEFLECTION COMMANDS
$(x, y)$ = FILM COORDINATES COEFFICIENTS $a(n)$, $b(n)$ ARE DETERMINED BY THE CALIBRATION PROCEDURE COEFFICIENTS $a(0)$ AND $b(0)$ ARE DETERMINED BY THE CALIBRATION PROCEDURE AND BY THE POSITION OF THE <X-Y> STAGES IN STEP-AND-REPEAT PRINTING

FIG. 2

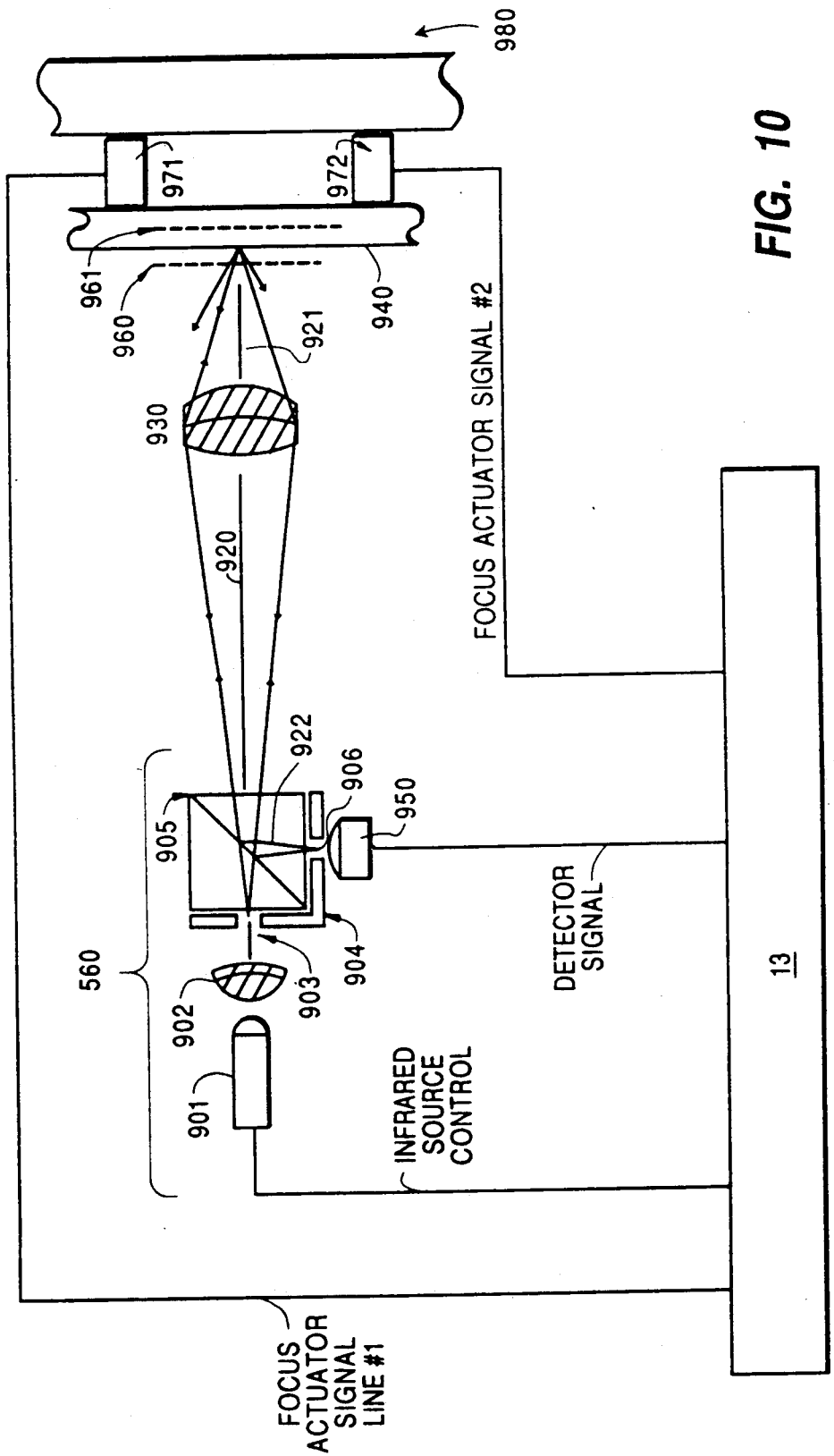

FILM PRINTING AND READING SYSTEM

CROSS-REFERENCE TO RELATED APPLICATIONS

This application is a Continuation-In-Part of U.S. Pat. Application Ser. No. 347,247, entitled "Film Printing/Reading System", filed on May 4, 1989, and now U.S. Pat. No. 4,924,254, which application is incorporated herein by reference in its entirety; and U.S. Pat. Application Ser. No. 348,551, entitled "Method and Apparatus for Forming a Recording on a Recording Medium", filed on May 8, 1989, which application is incorporated herein by reference in its entirety.

DESCRIPTION

1. Technical Field

This invention relates to a method of, and a photographic system for, exposing a recording medium to a light image. More specifically, the invention relates to a system which prints computer generated, or computer stored images or information onto light sensitive recording medium such as but not limited to, film while maintaining a high resolution and geometric accuracy in the recorded (printed) image. The system also provides the capability to read or digitize film-based imagery or information with the same high resolution and geometric accuracy.

2. Background Art

Many commercial film printers consist of a cathode ray tube (CRT), a lens, a film holder, and related drive and control electronics. An image displayed or drawn on the CRT faceplate is projected by the lens onto the film surface, and is thereby printed. Color images are frequently printed by decomposing the original image into three primary color frames and sequentially printing each frame through an appropriate color filter onto a single piece of recording media.

The image on a CRT faceplate is created by deflecting and modulating an electron beam within the CRT vacuum envelope. A layer of phosphor converts the electron beam energy to light. The resolution of the CRT image depends on the electron beam spot size and shape, the grain size of the CRT phosphor, and the degree to which the beam reflection system can accurately and reproducibly address an absolute position on the CRT face. The geometric accuracy of the CRT image, while not specifically dependent on the CRT resolution, can equally affect the resolution and accuracy of the printed image, as can distortions introduced by the projected lens or other components in the light path. The higher the resolution and geometric accuracy of the CRT image source, the more detailed, accurate and valuable will be the final printed image.

Other image characteristics, such as shading information, may be incorporated into the final printed image. U.S. Pat. No. 3,852,782 issued Dec. 3, 1974 to Gundlach et al., describes an imaging system wherein the light in contiguous sections of an image is differentially attenuated and focused through a select one of adjacent lenticules onto contiguous segments of a photoreceptor. This provides for the recording of highlights, medium tones, or shadows in the image produced on the photoreceptor.

It has been another object in the art to provide for the recordation of multiple images on a single piece of recording medium. U.S. Pat. No. 4,115,002, issued Sept. 19, 1978 to Clark, discloses a deVice whereby separate total images are selectively overlapped for integrating these individual images into a resulting final copy having a high information ratio. The images are projected onto the film plane through various lenses positioned in a predetermined manner. Provision is also made for color and density correction filters for altering the color balance and density, respectively, of the original images.

U.S. Pat. No. 3,703,135, issued Nov. 21, 1972 to Lang, also describes a multiple image film exposure and projection system. This system successively exposes small areas of a film frame through a shuttered lens array, thereby providing a plurality of individual images on the frame without the need to move either the camera or the frame.

A method of obtaining a double image of a single object is disclosed in U.S. Pat. No. 4,088,401, issued May 9, 1978 to Rees et al. In this method, multiple projection lenses with shutters are also used to achieve the double imaging.

A major difficulty in obtaining high resolution and accuracy in prior art film printers has been cost. In general, there is rarely an exactly known and fixed relationship between deflection system commands and resulting CRT beam position. Although this relationship may at some point in time be measured or calibrated, the varying of environmental factors such as temperature and magnetic field strength, as well as changes in the electronic components used to construct the beam positioning unit, tend to reduce the long term accuracy and reliability of such information. Components and systems resistant to such changes are costly and imperfect. Consequently, the CRT image and resulting film print are usually only an approximation to the initial or desired image data since the individual points of the image are never perfectly located.

Such considerations apply especially in the case of printing a color image. In order to insure correct registration of the three separate primary color frames, the film printer must maintain a high precision over the entire time required to print all three frames. Drift of the beam deflection electronic parameters make such registration difficult.

One way to achieve a higher CRT display accuracy uses feedback, whereby inaccuracies are in some way measured and corrected.

One such system, which utilizes a feedback arrangement to reduce the effect of vibrations on CRT display clarity is disclosed in U.S. Pat. No. 4,630,115 issued Dec. 16, 1986 to Hilsum. In particular, this device directs light from a spot on the CRT screen onto a photocell which detects the position of the light spot. Feedback is then utilized to process the output of the photocell detector to provide a correction signal which is, in turn, utilized by the deflection system of the CRT to adjust the position of the electron beam and, hence, the light spot. This correction is applied to the image as a whole in order to reduce the net motion of the image relative to the sensor. Individual points or pels within the image are not adjusted relative to one another, and the method does not enhance the accuracy, precision or resolution of the displayed image.

U.S Pat. No. 2,929,956, issued June 18, 1958 to Jacobs Et Al, relies on optical feedback of CRT beam location for a "Cathode-Ray Tube Sweep Control". In this system, light from the CRT is focused by relay lens onto a grating mask. As the CRT beam spot is swept across the CRT face, the projected image of the spot sweeps across the grating mask, alternately falling through the transparent lines of the grating onto a photo-sensor. The photo-sensor signal is processed and compared to a reference signal. Differences between these signals indicate a departure of the beam scan or sweep rate from a desired value. In this application, the apparatus is only sensitive to beam sweep rate. The position of the CRT beam is not measured either in relation to the CRT faceplate or in relation to the grating mask.

As discussed above, prior devices involve the use of single element photo-sensors. Moreover, where a photosensor is used to feed back CRT beam position information, the CRT beam must be moved to the periphery of the CRT surface in order to excite the sensor (Hilsum). The accuracy of the final, determined position of a light spot depends upon the precision of the photodetector system.

Deflection system calibration information derived from such beam position measurements becomes progressively less accurate in regions away from the point of calibration. Deflection corrections which apply to beam position in the interior of the image must be extrapolated from these peripheral data and are consequently less accurate. The effective measuring range of photosensitive element can be extended by enlarging the sensor area of the element. With this technique, however, it is increasingly difficult to ensure homogeneity over the entire enlarged sensor area. In addition, it becomes prohibitively expensive to provide further system components of sufficient precision.

U.S. Pat. No. 4,457,626 issued July 3, 1984 to Idesawa et al., describes an alternative type of device for more accurately determining position information. More specifically, this device includes a single lens in operative association with a mirrored cavity for reflecting a beam of light from a designated mark on an object onto a photosensitive element. The particular system used thereby, effectively enlarges the area of the photosensitive element. Idesawa et al.'s device uses a feedback algorithm which calculates positioning information based on the beam's detected position on the photosensitive element, the location of the object or spot source, and the number of reflections of the light beam within the mirrored cavity.

One disadvantage of this prior art device is the loss of intensity of the light beam incurred during reflection of the beam from the walls of the mirrored cavity. In addition, the walls of the mirrored cavity must be precisely parallel and flat to eliminate distortions which would otherwise occur. Also the size of the collection lens is limited to the physical size of the photosensitive element, because the mirrored walls must begin just at the edge of the photosensitive element and must encompass the collection lens. A further disadvantage with this prior art device is that absolute beam position calibration, absent some knowledge of the history of a spot's motion, has heretofore not been easily achieved.

U.S. Pat. No. 4,829,339, issued May 9, 1989 to Dwyer, which is incorporated herein by reference in its entirety, combines the idea of constructing a high resolution image in sections with the use of optical feedback to insure image integrity. This system serially exposes small areas of a recording medium by projecting light from a CRT image source through an array of shuttered lenses. Using beam position feedback, a controller accurately positions the elements of each image section during printing so that the image sections join to form a single image on the recording medium. The feedback sensor used in this application is a wide area, multiple element photo-sensor.

A disadvantage to this prior art is the use of a different lens element to project each section of the recorded image. As larger images are recorded, the number of elements in the lens array must grow. This increases the cost and the complexity of the device, and effectively limits the maximum film size that can be recorded using this method. Furthermore, multi-element, wide area photosensors such as charge coupled devices or arrays of photodiodes, are expensive and limited in size. Consequently, there is a limit to the accuracy of the beam position feedback path.

Thus, there exists in the art a genuine need for a film printing system which achieves a high precision and accuracy over an entire image area by the effective use of feedback for correct beam placement.

Furthermore, there exists a need for an inexpensive method of enhancing the effective area of existing photosensors without introducing distortions or limiting the available light.

Lastly, a need exists for the ability to precisely locate the CRT beam to provide for the accurate position and joining of adjacent image sections projected onto the recording film medium, thereby producing a single, high quality image that has a significantly higher resolution than the single CRT image source. Prior art does not disclose success in this process of merging image sections to reproduce a larger, original, single image. The prior art does reproduce multiple copies of a single image on a recording medium for application such as semiconductor device fabrication or reproduction of an original image.

DISCLOSURE OF INVENTION

The present invention provides a method and apparatus for recording an image onto a recording medium such as but not limited to film by sequentially printing an image in partial sections. This results in a printed image which is larger than the image source, or which contains more information than can be displayed on or printed by the image source at one time. Also, through the effective utilization of feedback of the position of the light spot used to record the image, errors in the placement of the individual elements of each section are so reduced that the resulting composite image appears nearly seamless. Thus, a high resolution, high accuracy, large size recording can be constructed through the repeated controlled use of a small, lower resolution image source.

In all embodiments of the invention, by decomposing a single image into sections, and by providing for relative motion between a light source and a recording medium during printing in such as manner that the original image is reassembled on the recording medium, the effective area or resolution of the image source is increased. In addition, appropriate color filters are used in reproducing color images. In particular, in a first embodiment of the invention the method and apparatus use a motor driven stepped motion between a CRT image source and recording medium in order to increase and enhance the effective resolution of the CRT.

Each section used to form the completed image is itself composed of image points printed by the light source. Errors in the placement of the various image sections, or in the points which compose each section, result in distortions or geometric errors in the printed image. Relative errors which accumulate between printed sections may result in the appearance of unwanted alternate light and dark lines at image section boundaries in the composite print. This effect serves to high-light the sectional construction of the recording, and is known as "tiling". To reduce the occurrence and extent of positional errors in the recording, the method and apparatus depend upon a type of feedback, e.g., optical. When the image source is a CRT, optical feedback of the beam position is used to locate the individual image points such that the image sections fit together correctly on the film, and display the desired geometry. Also, to reduce the chance of error, and to ease manufacturing requirements, the image sections are spaced such that at each section location, the image source can print over an area of the recording medium larger than necessary. This produces an overlap of coverage in border regions adjoining image sections, where the recorded image can accept light contributions from different relative position of the light source and recording medium. This overlap has two benefits. First, it reduces the accuracy with which the positioning system (translation unit) must locate the relative position of the light source and recording medium. Small errors in this location can be negated by utilizing the overlap area. Second, in such border regions the contributions of light to the image from different relative positions of the light source and recording medium can be tailored so as to reduce the effect of residual position errors on the composite image. For example, the image within border regions can be printed at a reduced intensity, which results in a "feathering" effect.

In a first embodiment of the invention, the feedback system and process involves the use of a large area multiple site photo-sensor to detect the position of the light spot used to record the image. This information is processed and used by a controller, which supervises the printing process, to correctly locate the light spot on the recording medium during printing. In the case where the image source is a CRT, the spot location is varied by varying the extent of deflection of the CRT electron beam.

The feedback sensor may be implemented using a mask having a plurality of apertures which intercept light from the light source with a photosensitive element spaced from a back surface of the mask for generating a signal dependent upon the position of the light intersecting the mask. The mask may be an exterior surface of a chamber with light only entering the chamber through the apertures with interior walls of the chamber transmitting light entering the chamber through the apertures and the photosensitive element being mounted on an interior surface of the chamber and producing a signal dependent upon the position of the light intersecting the mask apertures.

The feedback data is used to construct a mathematical mapping between light source positions and recording medium positions so that a light spot which can be moved to various positions on the light source and which is used to expose the recording can be precisely located so that it falls on and exposes the desired region of the recording medium.

Precise measurement of the location of the apertures in the mask in terms of light spot coordinates is necessary for an accurate determination of the mapping. Pattern recognition techniques, where the transparent features of the mask are located by reference to a predetermined template, are used to reduce errors which naturally occur in any measurement or calibration process. The redundancy caused by similar mask features is removed either by marking each structure with a identification code, or by using the inherent residual linearity of the image source deflection mechanism along with low resolution translator encoder position information, or by using high resolution encoders on the translator along with residual deflection linearity.

The method and apparatus of the present invention can read as well as print film-based images or information. Film can be read by using the CRT light spot as a light source and measuring the amount of light transmitted through the film by some type of photo-sensor, e.g., photo-diode or photo-multiplier tube. The feedback sensor of the present invention is used in the reading process to accurately position the beam to read out information at a precisely addressed location on the recorded medium and provide enhancements to the system.

The invention can be implemented to print a single image by sequentially printing a plurality of sections which comprise the single image by providing relative motion between a light source and a recording medium. The relative motion is produced by a translator having controllable positions for moving the recording medium relative to the light source during the recording of each of the plurality of sections. Prior to recording each section, a calibration system associated with the translator provides a position signal representing a position of the translator and a controller which also controls the position of light emitted from the light source determines if the translator is properly positioned to permit the printing of the next section to be recorded. If the translator is not properly positioned to permit recording of the next section, the controller causes a position command to be transmitted to the translator to cause the translator to move to a position to permit recording of the next section. In several embodiments of the invention, the translator has a low resolution position detector which provides the controller with low resolution coordinates. Furthermore, higher resolution coordinates are provided by the use of a mask which is monitored by the controller using optical feedback. The calibration of the position of light emitted from the light source provided by the optical feedback system is typically performed after movement of the translator to position the recording medium at a high resolution position to record a next section.

In order to maintain a high resolution in the printed image, it is necessary that the image light source be properly focused onto the recording medium. A film position actuator unit, under command of a controller, moves at least the film plane closer to or further from the image projection lens in response to a focus signal provided by a focus detector. In one embodiment, the focus detector consists of an infrared light source and light detection assembly. Light from this source is focused by a lens onto a plane which represents the best position of the film or recording medium for proper focus. This light is scattered from the film and returned to an infrared photo-sensor. The position of the recording medium relative to the desired position will modulate the intensity of the returned infrared light. As the recording medium is moved by actuators through the focal plane of the projection lens, a location of best focus can be identified. Infrared light is used as a probe in one embodiment of the focus mechanism since many films are not subject to exposure when illuminated by radiation of this wavelength.

An apparatus for recording an image onto a light recording medium by sequentially recording a plurality of sections onto the light recording medium which constitute the image in accordance with the invention includes a light source which emits light at a position which is movable over a light emitting area of the light source controlled by a controller, the position of the light being subject to deviation from a desired position of the light emitting area of the light source which corresponds to a position to be recorded on the recording medium which has recording position coordinates; a translator having controllable positions for moving the recording medium relative to a light source during the recording of the plurality of sections of the image; a light transmitting path disposed between the light source and the recording medium for transmitting the light from the light source to the recording medium; and a light position sensor having a target area having a plurality of apertures including at least one line segment coupled to light emitted from a plurality of positions within the light emitting area of the light source used for recording for detecting the position of the light intersecting the target area of the sensor from the light emitting area of the light source and generating at least one signal dependent upon the light intersecting the target area; and wherein the controller, responsive to the at least one signal, produces at least one correction parameter, sequentially controls the recording of the sections to record the image by controlling the position of the light on the light emitting area of the light source as a function of the at least one correction parameter during the recording of each section to cause the light to move to coordinates on the light emitting area of the light source to cause the light to intersect the recording medium at the recording position coordinates and controls the position of the translator for recording of each section. A plurality of apertures may contain a line segment which may be intersecting line segments or nonintersecting line segments. The plurality of apertures may be a ring.

The light source emits light from the light emitting area to intersect an area on the target area containing at least one line segment; and the controller stores a sensed array of data points, which are correlated with the area of the target containing the at least one line segment representing an intensity of the light sensed by the sensor at each data point and processes the sensed array of data points to produce the at least one correction parameter. The controller convolves a corresponding stored array of data points representing a structure of the at least one line segment with the sensed datapoints to produce a convolution array of datapoints, processes the convolution array to detect a maximum magnitude and generates the at least one correction parameter as a function of the maximum magnitude.

The target area is a mask containing the apertures with light from the light emitting area intersecting one side of the target area; and further in accordance with the invention, a photosensor is spaced apart from a side opposed to the side on which light intersects the mask for generating a signal proportional to the intensity of the light passing through the apertures.

The light transmitting path may have different embodiments. A first embodiment includes an optical transmission path coupling light from the light emitting area to the recording medium and to the light position sensor including a beamsplitter splitting light emitted from the light emitting area into a first light beam and a second light beam, a first lens focusing the first light beam onto the recording medium and a second lens focusing the second light beam onto the light position sensor. A second embodiment of the light transmitting path includes an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, the second lens focusing the third light beam onto the recording medium and a third lens focusing the fourth light beam onto the another light position sensor; and wherein the controller processes signals from the light sensors to correct for a position error.

The invention further includes a position encoder associated with the translator for providing the controller with position coordinates of the translator with a first level of resolution; and wherein the recording medium and the mask are mounted on the translator; the light emitting area projects light onto the mask to cause the photosensor to output signals in response to light passing through an aperture intersecting the photosensor; and the controller determines coordinates of the position of the translator with a second higher level of resolution than the first level of resolution in response to signals outputted by the photosensor and a position of the light on the light emitting area of the light source.

The invention further includes an optically readable data associated with the apertures which provide information used for specifying a position of at least one of the apertures in the target area. The optically readable data associated with the apertures occur periodically across the target area along at least one coordinate axis with each data specifying a position of an associated aperture. An optically readable data may be associated with each aperture for specifying the position of the associated aperture.

The invention further includes a focusing system for varying a position of the recording medium in a direction parallel to the direction of incident light for positioning the recording medium at a best focused position with respect to the light source. The focusing system varies the position of the recording medium with respect to the light transmitting medium until light returned from the recording medium intersecting a focusing photosensitive element has a minimum area. The focusing system further includes a mechanism for moving the recording medium in the direction parallel to the direction of incident light in response to control signals produced in response to a focus signal produced by the focusing photosensitive element.

During recording of a section, the light position sensor receives light passing through a number of apertures which is less than the plurality of apertures.

An apparatus for reading previously recorded information disposed on a recording medium in accordance with the invention includes a light source which emits light at a position which is movable over a light emitting area of the light source controlled by a controller, the position of the light being subject to deviation from a desired position on the light emitting area of the light source which corresponds to a position to be read on the recording medium which has recorded position coordinates; a translator having controllable positions for moving the recording medium relative to a light source during the reading of the recorded information; a light transmitting means disposed between the light source and the recording medium for transmitting the light from the light source to the recording medium; and a light position sensor having a target area having a plurality of apertures including at least one line segment coupled to light emitted from a plurality of positions within the light emitting area of the light source used for reading for detecting the position of the light intersecting the target area of the sensor from the light emitting area of the light source and generating at least one signal dependent upon the light intersecting the target area; and wherein the controller, responsive to the at least one signal, produces at least one correction parameter, sequentially controls reading of the information in sections by controlling the position of the light on the light emitting area of the light source as a function of the at least one correction parameter during the reading to cause the light to move to coordinates on the light emitting area of the light source to cause the light to intersect the recording medium at the recorded position coordinates and controls the position of the translator for reading of each section.

The target area is a mask containing the apertures with light from the light emitting area intersecting one side of the target area; and the invention further includes a photosensor spaced apart from a side opposed to the side on which light intersects the mask for generating a signal proportional to the intensity of light passing through the apertures.

The invention further includes a focusing system for varying a position of the recording medium in a direction parallel to the direction of incident light for positioning the recording medium at a best focused position with respect to the light source. The focusing system varies the position of the recording medium with respect to the direction of incident light until light returned from the recording medium intersecting a focusing photosensitive element has a minimum area. The focusing system further includes a mechanism for varying the recording medium in a direction parallel to the direction of incident light in response to control signals produced in response to a focused signal produced by the photosensitive element.

The light transmitting path further comprises an optical transmission path coupling light from the light emitting area to the recording medium and to the light position sensor and to another light position sensor including a first beamsplitter splitting light emitted from the light emitting area into a first light beam and a second light beam, a first lens focusing the first light beam onto the light position sensor, a second beamsplitter splitting the second light beam into third and fourth light beams, a second lens focusing the third light beam onto the recording medium and a third lens focusing the fourth light beam onto the another light position sensor; and wherein the controller processes signals from the light sensors to correct for a position error.

BRIEF DESCRIPTION OF DRAWINGS

A better understanding will be had by referring to the accompanying drawings, in which:

FIG. 2 illustrates the use of a power series to encode the deflection calibration;

FIG. 10 illustrates an embodiment of a focus detector used with embodiments of the present invention.

BEST MODE FOR CARRYING OUT THE INVENTION

Figure 1:
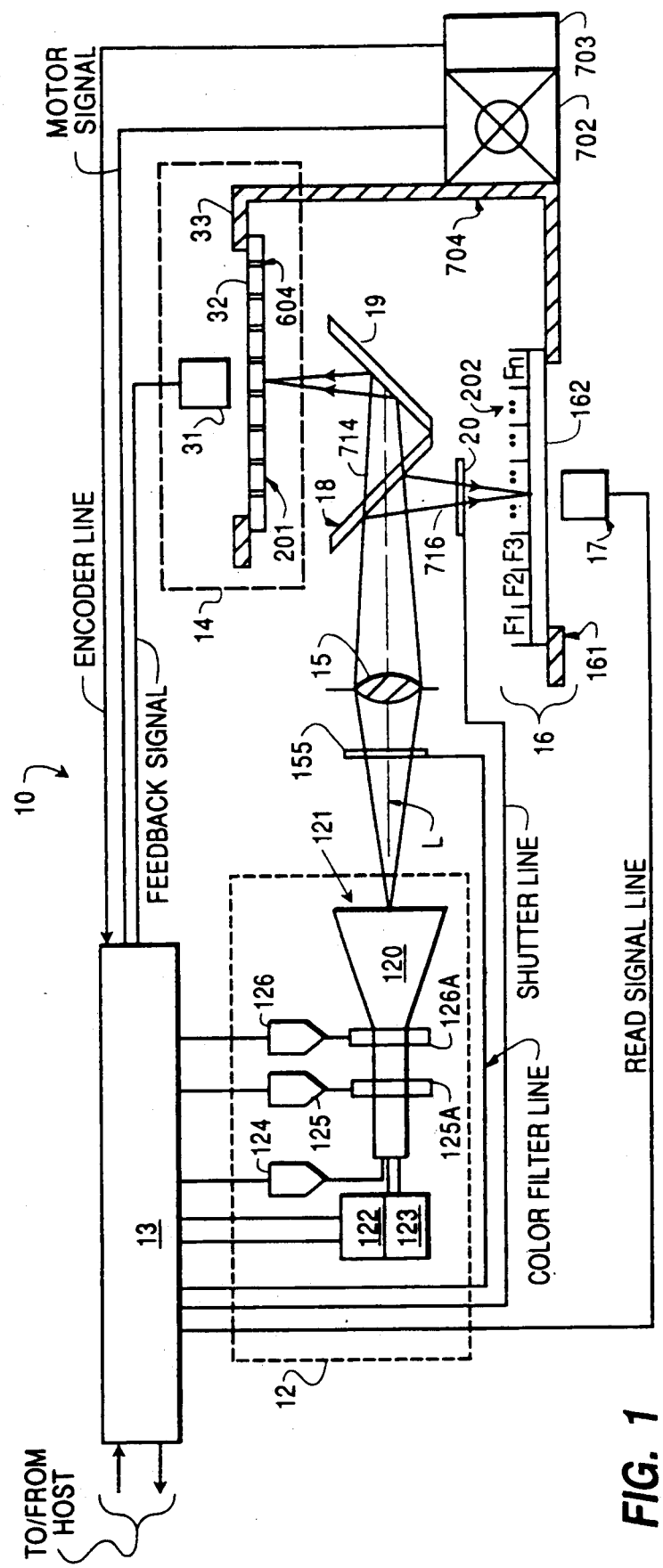
FIG. 1 is a block diagram of a first embodiment of a recording/reading system of the present invention.

Referring now to the drawings and, more particularly, to FIG. 1, a first embodiment 10 of a film printing/reading system in accordance with the invention is illustrated. The first embodiment 10 generally comprises an image/light source 12, controller 13, feedback sensor 14, printing lens 15, film plane assembly 16, and reading sensor 17.

In a preferred embodiment, image/light source 12 generally consists of a cathode ray tube (CRT) 120. CRT 120 provides for the illumination of encoded information such as an image on the CRT faceplate 121. Image light source 12 also contains power supplies, e.g., anode and focus power supplies 122 and heater and control grid (G1, G2) power supplies 123, as well as video amplifier 124, all of which serve to produce an image on the CRT faceplate. More specifically, the image on the CRT faceplate is created in a way similar to that used in displaying commercial television images, viz., by deflecting and modulating an electron beam within the CRT vacuum envelope. Accordingly, X deflection amplifier 125 and Y deflection amplifier 126 are controllable reflection assemblies such as digital to analog converters followed by power amplifiers which are used in conjunction with X deflection yoke 125A and Y deflection yoke 126A, respectively, to deflect the electron beam to points on the CRT faceplate 121.

In producing an image, points on the CRT faceplate are mapped onto film plane assembly 16 by lens 15 and beamsplitter 18. In order to increase the number of pels or lines which may be printed by a CRT 120 of fixed resolution, an image is divided into sections and printed by section onto film plane assembly 16 with the sections being addressable with X,Y coordinates or other coordinate systems. Film plane assembly 16 consists of a film holder 161 which contains a recording medium 162, such as film, upon which an image is projected. The film is supported by holder 161, and fastened to it by clips or other fasteners which are not part of the present invention.

It should be recognized that applications involving both monochromatic (black and white) and polychromatic (multiple individual colors) images are encompassed within the scope of the present invention. In the case of the latter embodiment, a color filter 155 is positioned proximate to the printing lens 15 such that light passing through the lens also passes through filter 155 and, thus, assumes the appropriate color value before being projected onto the film plane assembly 16. Generally, such color filters are mounted on a wheel or ring referred to as a "filter wheel". The controller 13 controls the positioning of a filter having an appropriate color value in the optical path of the light for purposes of recording on the film with the color of light transmitted by the filter.

The film plane assembly 16, and more particularly, the recording medium 162, is separated into a theoretical matrix of tangential square regions F1-FN which fully cover the recording medium. Translator 702 is provided having a plurality of controllable positions locatable in a coordinate system for moving the recording medium relative to the image source during the recording of a plurality of sections which comprise the image. In accordance with the invention, the translator 702 functions to position the film plane assembly 16 to record a plurality of sections which constitute the image by sequentially moving the recording medium held by the film plane assembly to a different position each time a next section is to be recorded. The translator 702 includes a movable platform 704 which contains a pair of motors which are movable in accordance with (X,Y) program coordinates which are supplied from the controller 13. Alternatively, motion of the translator under position commands from the controller 13 in other coordinate systems is within the scope of the invention as well as either moving the CRT 120 relative to a fixed film assembly 16, or moving the film assembly and image source each in independent directions. In a preferred embodiment, the CRT 120, controller 13, beamsplitter 18 and mirror 19, lens 15, color filters 155, shutter 20, and photo-sensors 17 and 31 all remain in a fixed position while the recording medium assembly 16, translator 704, motor 702, mask 32, and mask holder 33 are allowed to move. The motion of the translator in FIG. 1 is to the left/right, and in/out of the plane of the figure.

As illustrated the translator 702 provides high resolution position coordinates from a position sensor 703 associated with the movable platform to provide the controller with X and Y coordinates of sufficient accuracy to permit high accuracy measurement of the relative positions of the film and image source. The controller 13 would not function properly to calibrate the deflection system without high resolution of the movable platform 704 as a consequence of the calibration of the deflection system involving mapping of the light emitted form the CRT on the coordinates of the film plane assembly which necessarily requires an accurate location of the film plane assembly to be sensed. Each time the recording medium is to be moved to record a new section, a new set of coordinates are outputted by the controller 13 to the movable platform 704 to command it to move to a new position. The movable platform 704 may be moved under control of a pair of stepping motors which respectively move the platform in orthogonal directions. A high resolution position encoder 703 provides the controller with the aforementioned precise location coordinates of the movable table so as to permit the controller 13 to command the precise position to which the table should be moved to print the next section. Shutter 20 selectively opens under the control of a shutter signal outputted by controller 13. When closed, shutter 20 serves to prevent accidental exposure of the recording medium during any calibration sequence which requires that the CRT be activated.

Beam splitter 18 splits light emitted from the CRT 120 into two optical paths 714 and 716 which respectively image light on feedback sensor 14 after reflection from mirror 19, and photosensitive medium 162 which is in the optical path of 716.

In order to accurately reproduce an image, therefore, each section of the final image must be printed without the effects of gaps or overlaps associated with adjacent sections. To accomplish this result, the system 10 utilizes feedback assembly 14 and controller 13.

As each image point on the recording medium is exposed, the CRT light spot is positioned at some location on the CRT faceplate 121. Light from this location is projected onto the recording medium by lens 15 and beamsplitter 18. The light spot on CRT faceplate is positioned as controller 13 sends deflection commands, also known as "CRT coordinates", to the deflection system. Consequently, the position of the light spot on the recording medium changes in response to controller command signals. Under normal conditions, there is a unique mapping between controller commands and light spot positions on the recording medium. If this mapping or relationship could be measured or established, then the light spot could be located correctly and precisely on the recording medium by the controller, and images could be printed without the effect of distortion. In practice, this mapping or relationship varies as environmental factors such as temperature and magnetic field vary. For example, these factors influence the size and shape of the physical components used to fabricate the system. As the physical components expand and contract, the exact relationship between the recording medium and image source will change as will the details of the mapping between the two. Furthermore, the parametric values of the electronic components used to construct the deflection system will change with age, thus influencing the mapping. Consequently, it is necessary to periodically update any measurement or calibration of this mapping.

The mapping or relationship can take a number of forms depending on the exact configuration of the hardware, but normally can be expressed as a series expansion as illustrated in FIG. 2. This relationship is established by the controller based on accumulated measured data which relates controller deflection commands to physical locations on the recording medium. The series parameters or coefficients, shown as A(N) and B(N) in FIG. 2, can be derived using a least squared fit of the mapping data to the fixed form of the series expansion. Other expressions of the mapping data are within the scope of the present invention. For example, interpolation of the data forms a useful alternative to power series evaluation. In the series expansion, the expansion coefficients are an encoded form of the geometric relationship between the sensor and film planes. Thus, the specific terms included in the expansion will vary as the form of the film printer assembly varies.

Optical feedback assembly 14 is used to establish this mapping, as expressed by the expansion series coefficients. Although this process is referred to as a calibration of the deflection system, the calibration also naturally corrects for optical aberrations of the light transport system such as the projection lens. The calibration that relates CRT coordinates to film coordinates automatically takes into account all aberrations, non-linearities, etc. that affect the position of the light spot on the film plane. The term "deflection calibration" is used because only the deflection system parameters are normally subject to rapid change.

During the calibration process, a mathematical mapping or relationship is established between controller commands and film plane positions. Referring to FIG. 1, data relating positions on the recording plane to deflection commands are accumulated using feedback assembly 14 which consists of a mask 32, mask holder 33, and photosensor assembly 31. Mask 32 is an opaque mask with transparent aperture structures etched in the surface. Generally, the body of the mask is glass or quartz, and the mask is rendered largely opaque to light by coating one surface with chrome, or another optically opaque material. The transparent structures are etched clear in accordance with a predetermined pattern. In the preferred embodiment of the invention, this mask resides in an optical position equivalent to the recording medium. Referring to FIG. 1, the surface of the mask 201, and the photosensitive surface of the recording medium both lie in the image plane of lens 15. The overall cost of the feedback assembly 14 is much less than equivalent wide area sensors, such as charge coupled devices (CCD's), or photo-diode arrays, and the size of the mask element 32 can be much larger than available wide area sensors. Thus, the use of a single photosensor 31 accompanied by a wide area mask 32 forms an effective, large size, precision beam light position sensor at low cost. The spacing between individual apertures or structures of 201 is chosen to be slightly larger than the ability of the cathode ray tube 120 to position the light beam at a particular location on its light emitting surface. This criteria for spacing the structures insures that the proper mask structure is probed during calibration.

Figure 8:
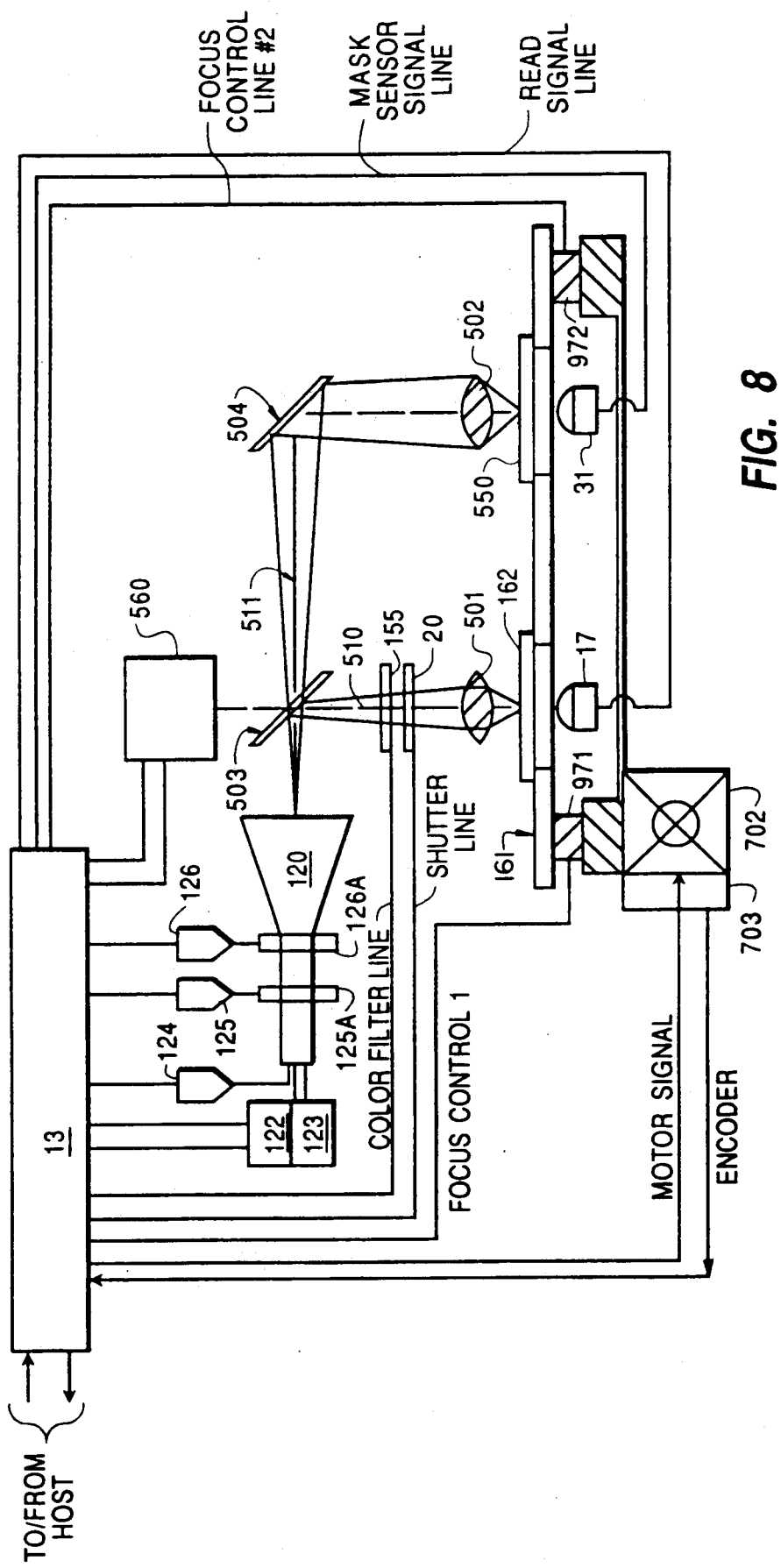
FIG. 8 illustrates a first alternative embodiment of a reading/recording system of the present invention.
Figure 9:
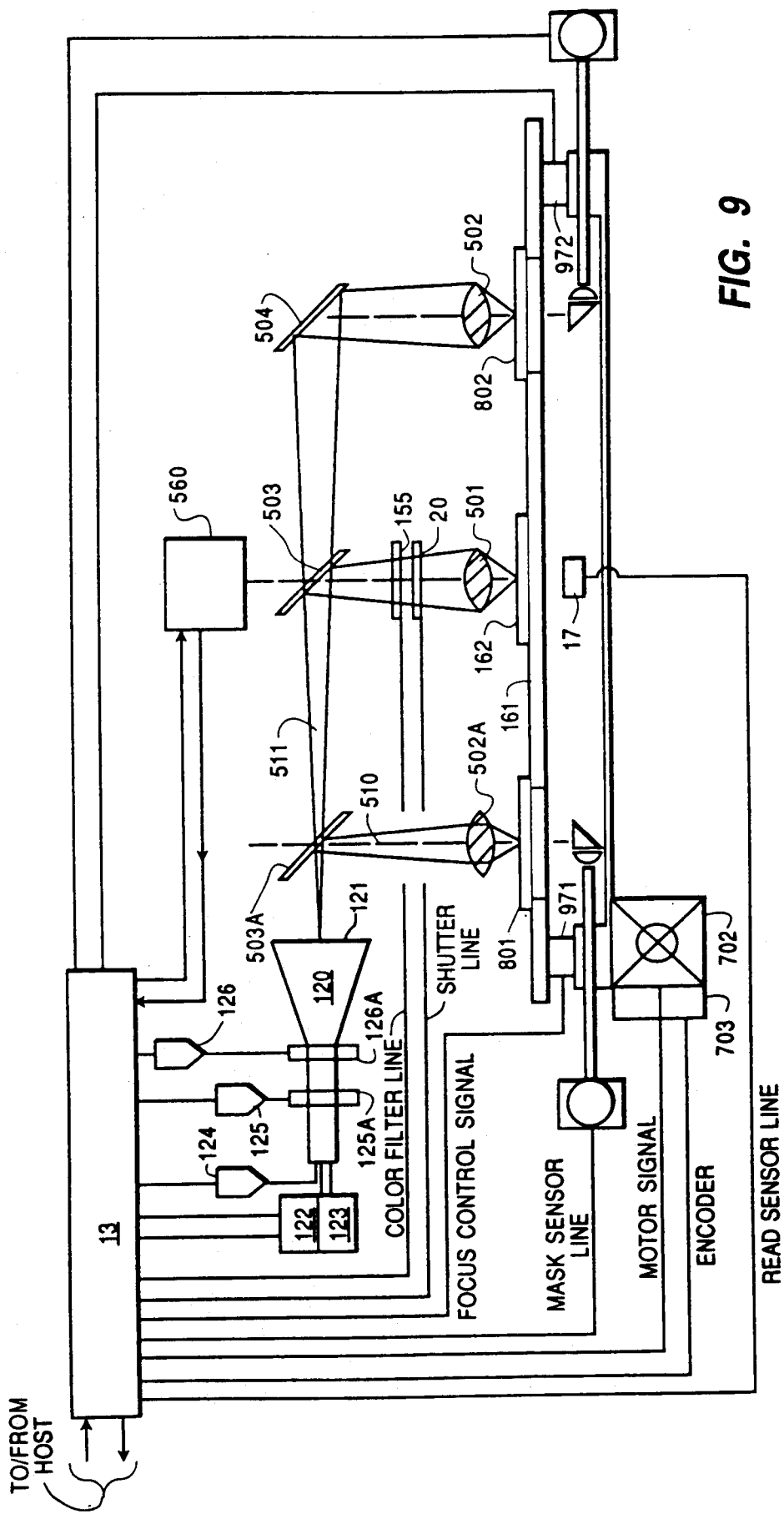
FIG. 9 illustrates a second alternative embodiment of a reading/recording system of the present invention.

Mask sensor 31 is used to calibrate the CRT deflection system. This calibration is performed by moving the CRT beam to a location such that an image of the light spot falls on an aperture 604 of the mask 32. Finding this location may involve moving the CRT beam in a "search pattern" but the success of the search is detected by a response from the photosensitive element 31. There is no mechanism to tell from the photosensor 31 which aperture 604 the light is coming through so there is a certain amount of ambiguity in the calibration. This ambiguity can be removed by the "rough" calibration of the CRT deflection system. In some embodiments, this information is supplemented by the "rough" measurement of the translating mechanism described below in conjunction with the embodiments illustrated in FIGS. 8 and 9 provided by the optical encoders attached to the translator motors. In other embodiments, identification codes or information (data) are written or affixed to the mask near each transparent mask structure. Disregarding the position of the translator, it is always possible to deflect the CRT beam to an approximate point of the CRT without activating any feedback loops. This is possible because deflection systems are normally accurate to a few percent. This "residual" calibration of the CRT deflection is used to remove the ambiguity in determining which aperture 604 is active in transmitting light reaching the photosensitive element 31 of mask 201 within feedback assembly 14. Calibration proceeds from the standard "residual" deflection calibration to moving the CRT beam to a point where the odds are good that an image of the beam will be projected onto a particular aperture 604 in the sensor 14. A determination is made if the aperture 604 was intersected by the light beam by the controller 13 monitoring the photosensor 31 output. If no output is produced, the aperture 604 has been missed and a search pattern must be undertaken. The CRT beam is moved in small increments in a predetermined pattern such as rectangles of increasing periphery until a response is produced by the photosensor 31. Once a response is produced by the photosensor 31, the controller now knows exactly where the beam is with respect to the recording medium plane since the exact location of each aperture 604 with respect to the recording medium is factory calibrated. Performing this "search and remember" process of a number of aperture 604 provides sufficient data to calibrate the deflection system in terms of recording medium plane coordinates. For the embodiments of FIGS. 8 and 9 which have a movable translator not equipped with high resolution position encoders, additional calibration is needed which is described below.

Figure 7:
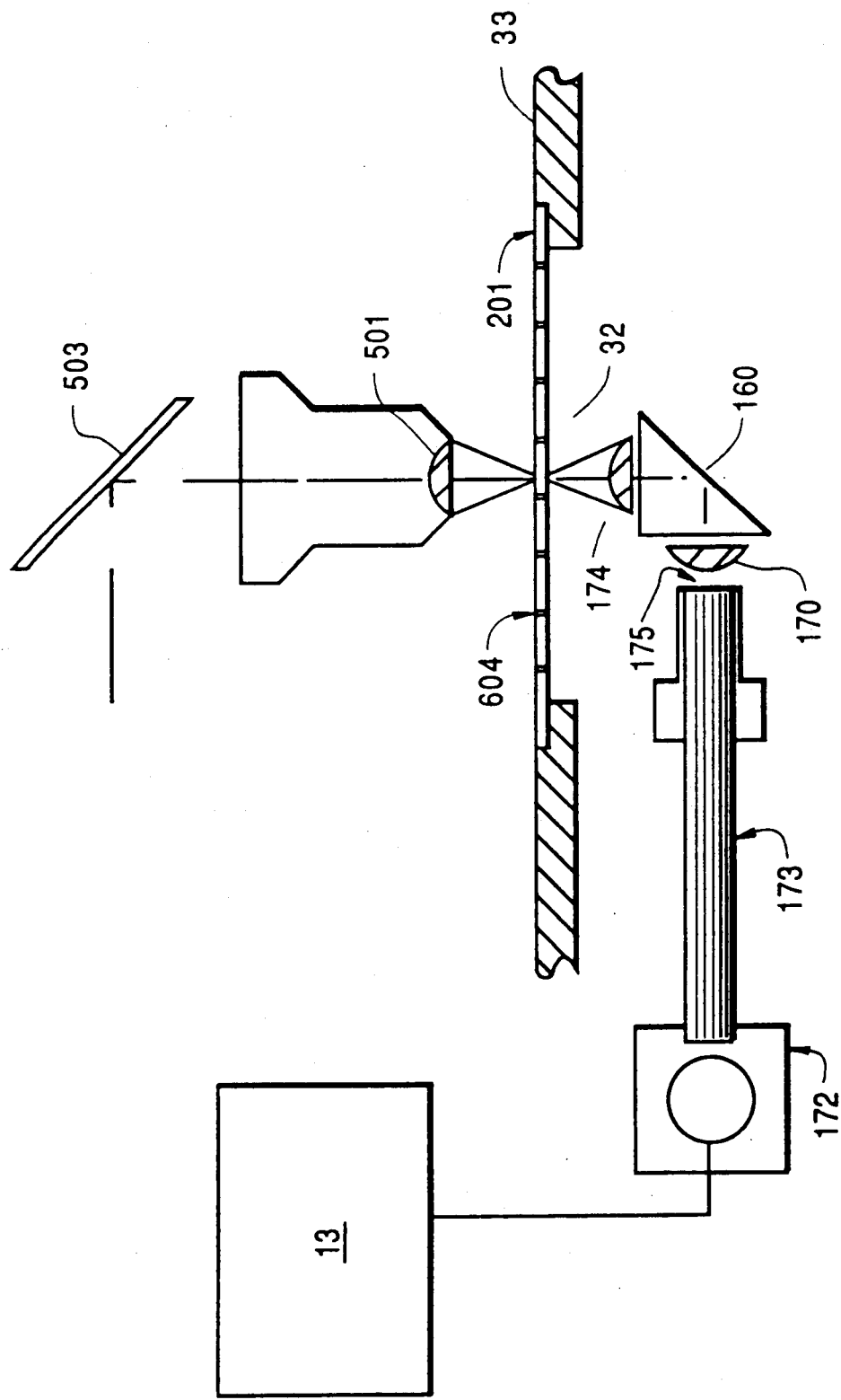
FIG. 7 illustrates an embodiment of a feedback sensor used with the embodiments of the present invention.

One embodiment of photosensor 31 is illustrated in FIG. 7. Referring to that figure, light from the light source is projected onto surface 201 of mask 32 by a calibration lens, here shown as 501. The mask will allow the light to pass in selective transparent areas. This light is collected by lens 174, reflected by prism 160, and directed by lens 170 into fiber optics bundle 173, which conveys the light to photosensor 172. Sensor 172 can be a photo-diode, or photomultiplier tube, for example. A signal from photomultiplier 172 is digitized and stored by controller 13. The use of flexible fiber optics bundle 173 to convey light helps locate the large size photomultiplier tube more conveniently to the side of the apparatus. The effective light collection area of sensor 31 can be smaller than the area of mask 32. During recording and reading of a section F1-FN, the light position sensor receives light passing through a number of apertures which is less than the number of apertures 604 in the mask 32. This is because the image is printed in sections, and only mask locations which lie in the restricted area corresponding to the section of the film being printed need be considered during calibration. As illustrated in FIG. 7, elements 174, 160, 170, and 173 of sensor 31 remain in fixed position relative to lens 501. The mask 32, and holder 33 move together with the film as the image source is moved relative to the film during the step and repeat style printing. Thus, a smaller sensor can be used if the sensor remains in fixed position relative to the mask lens. In some applications, space allows for the direct placement of the fiber optics bundle 173, and in particular end 175 of the bundle, directly under and closely spaced to mask 32. This geometry allows for efficient collection of light by bundle 173 while eliminating the need for optical elements 170, 160 and 174. However, the diameter of the fiber optics bundle at end 175 must be sufficiently large to accommodate the collection of light from all areas of the field of lens 501. This particular geometry in the light collection optics is useful when printing very high resolution imagery, where the individual image sections can be less than .06 inches in diameter.

Figure 3A:
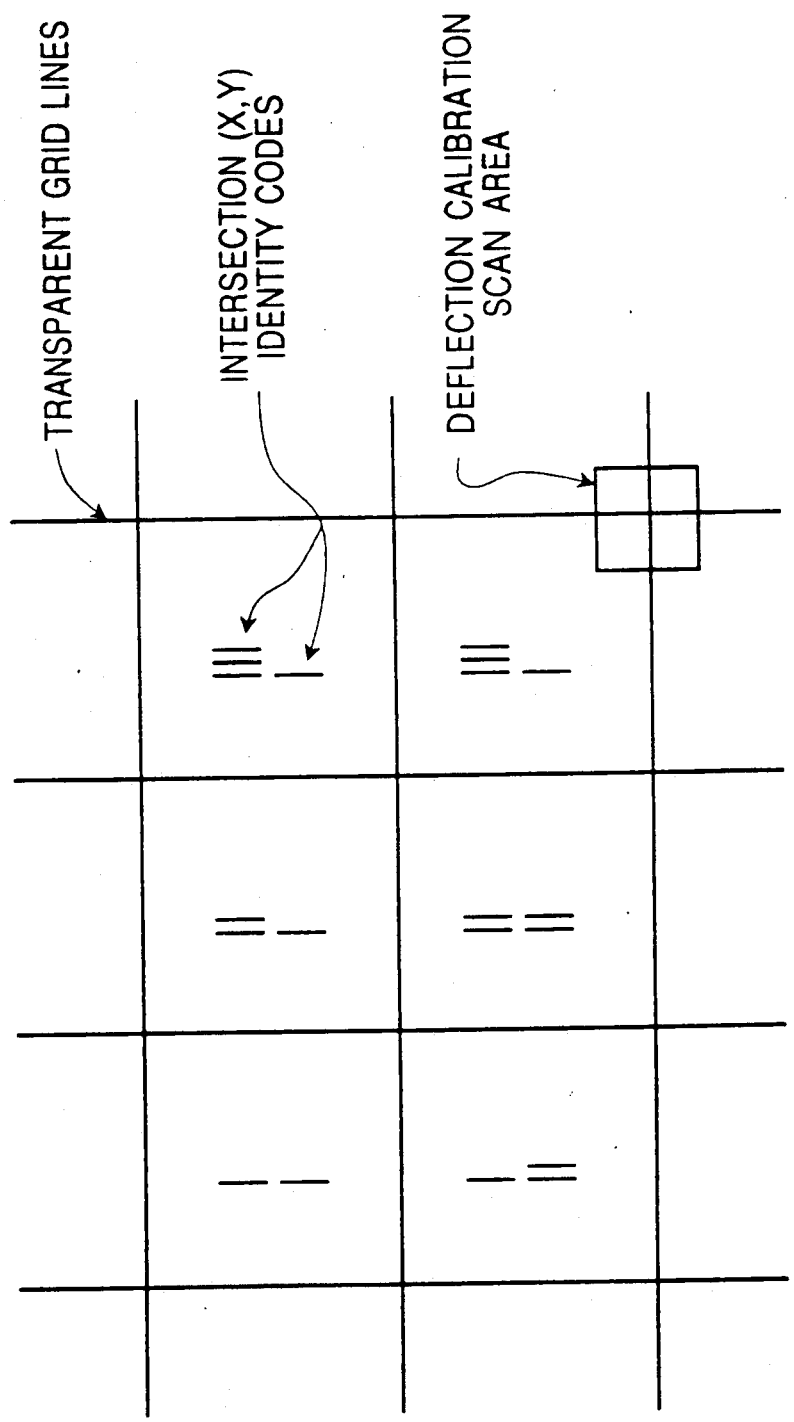
FIGS. 3A-D illustrate different embodiments of a mask used with the optical feedback sensor.
Figure 3B:
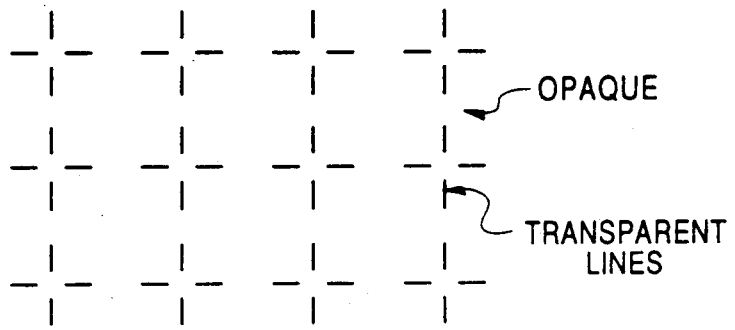
Figure 3C:
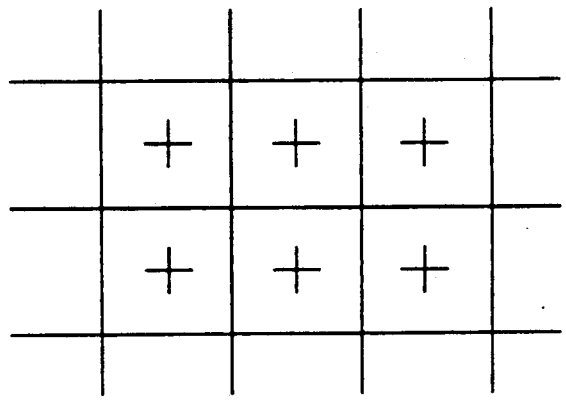
Figure 3D:
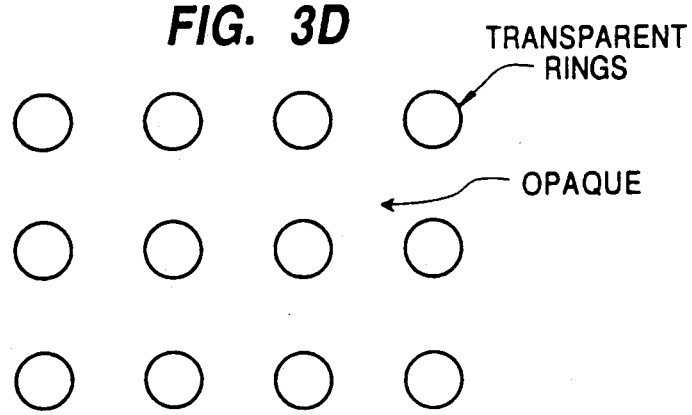

In an alternate deflection calibration procedure, mask 32 consists of a Cartesian grid of transparent lines, as illustrated in FIG. 3A. The width of the transparent lines is nominally set to be a few times the width of the projected CRT light spot used to probe the mask plane. The scale or spacing of the lines is determined by the ability of the residual CRT deflection calibration to identify particular intersections, and by the need for multiple calibration sites within the area presented at each new image section. In this embodiment the numerous intersections of the transparent X- and Y-grid lines form structures which can be recognized as part of the calibration procedure. The intersection structures occur at set, known intervals on the mask due to the regularity of the grid. As above, the position of each intersection must be found and, when accompanied by CRT deflection coordinates, will be interpreted by controller 13 to form a mathematical mapping between the CRT and film. FIGS. 3B, 3C and 3D illustrate other embodiments of the mask structures. A critical element of this process is that each structure be reliably recognized and accurately located. Two improvements further increase the precision and reliability of this process.

First, in a preferred embodiment, encoded identification marks (data) are etched into the mask as transparent lines which serve to denote the identity and position of each intersection. Identification marks are illustrated in FIG. 3A. This method is equivalent to writing the value of the (X,Y) Cartesian coordinates on each intersection of a sheet of graph paper in order to absolutely identify each intersection. Here, the identification data can be encoded as product bar-code lines, as numerical data, or in some other form. These identification data can be read by scanning the CRT light spot over the transparent marks used to fabricate the code on the mask. Light sensor 31 will sense the modulation of the transmitted light by the encoded data, and the modulation will be interpreted by controller 13 to yield the identity of the near-by intersection. These identification codes will be located in fixed relation to the identified intersection. As shown in FIG. 3A, these marks are located below and to the right of each intersection, and are constructed as series of vertical lines. The marking of each intersection removes the redundancy in the mask pattern, and the mask pattern then can provide unambiguous, absolute light spot position information absent any further data. Furthermore, since the mask grid lines can rarely be fabricated free of geometric error, factory calibration information which identifies the precise location of each intersection can accompany the film printer/reader product, and can be recalled in a correction routine as the identity of each intersection is determined, for example, the identity code can be used as a pointer to correction or position data in memory addressable by controller 13. In practice, the identity codes can be written for each structure, or alternately only periodically for a reduced subset of mask structure locations. This significantly improves the accuracy of the mask, and of the calibration procedure with little added cost to the system.

In a preferred embodiment of the second improvement, an area scan replaces the "search" pattern described above in locating each transparent mask structure. In this search method, a square array of points located about the expected location of a mask structure is scanned by the CRT light spot. Such as area is illustrated in FIG. 3A. At each array point the amount of transmitted light is measured by photo-sensor sensor 31. The anticipated position of a particular mask structure can be estimated using the residual CRT calibration and data which results from a start-up calibration in which a first structure is identified by a spiral search as described above.

The resulting data array represents the transparency of the mask within the scan area. The precise location of the transparent intersection is then measured by performing a mathematical convolution between the data array and a template array drawn from the expected shape and width of a typical intersection.

For mathematical convenience, the transparency data array and the template data array should have the same array size or dimension. The convolution is evaluated as each element of the transparency array is multiplied by the corresponding element of the template array, with the product being summed over all array locations. This sum is evaluated for all possible relative shifts or offsets between the two arrays, and consequently forms a convolution array which has the same size as each of the input arrays.

Figure 4:
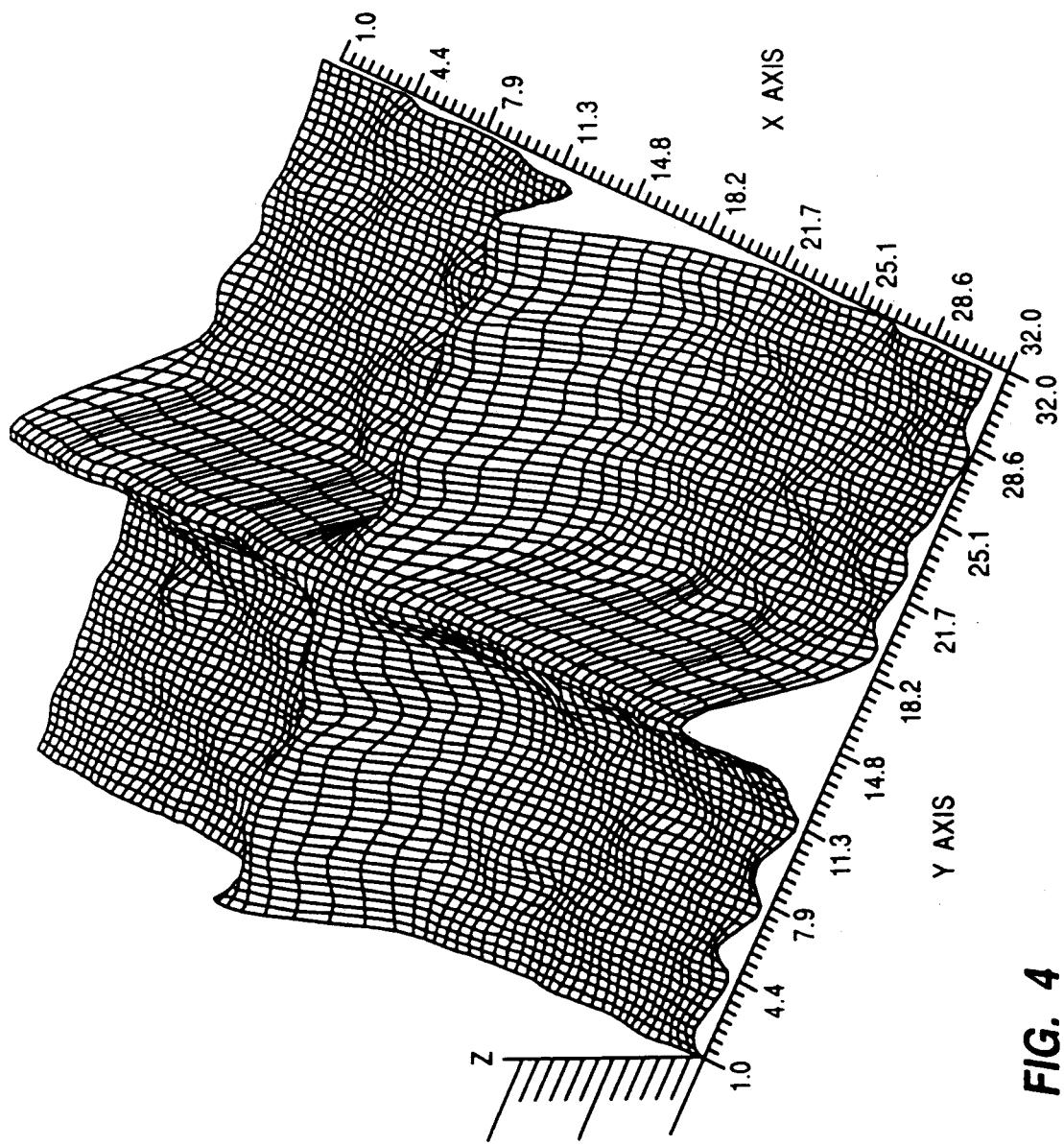
FIG. 4 is a graph of the transparency of the feedback mask near a grid intersection point.
Figure 5:
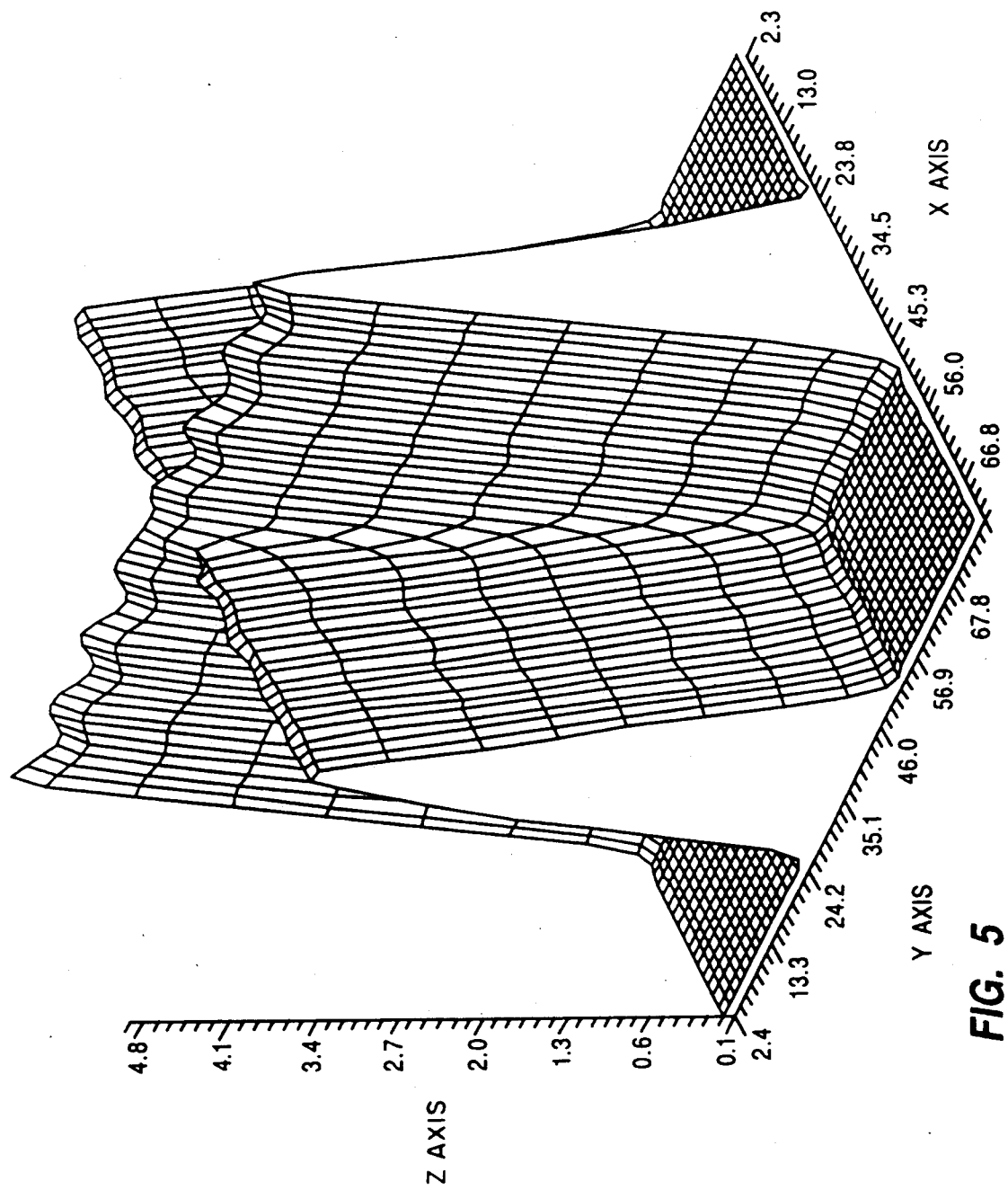
FIG. 5 is a graph of the template used in the automated recognition of mask features.
Figure 6:
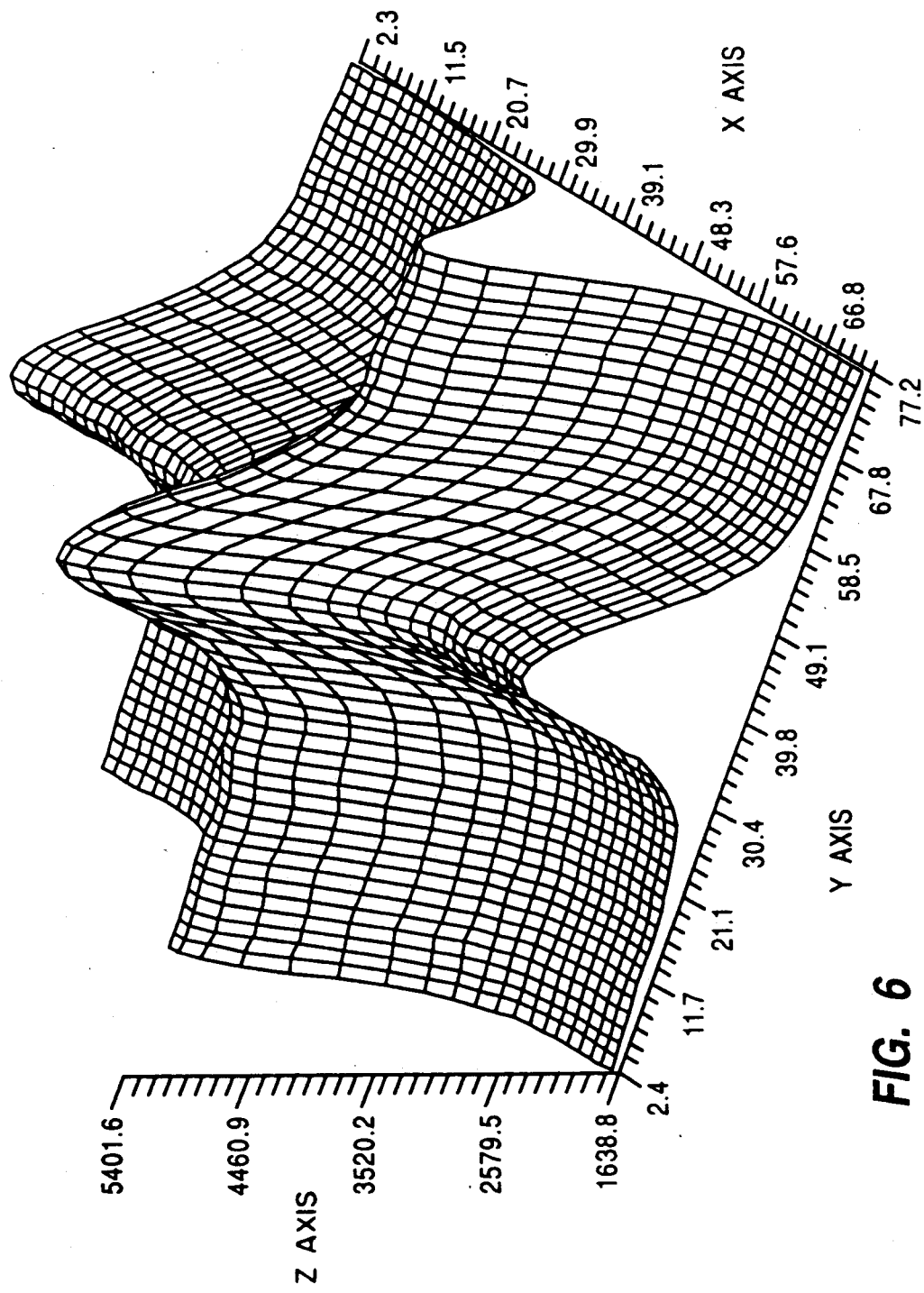
FIG. 6 is a graph of the convolution between the mask transparency data of FIG. 4 and the reference template data of FIG. 5.

FIGS. 4, 5, and 6 illustrate respectively a transparency array, template array and resulting convolution array drawn from real data. These arrays are represented as three dimensional graphs, where the X- and Y-axies identify the position of the data element relative to the mask, and the Z- or vertical axis represents the signal strength. For the transparency array, the vertical axis indicates the transparency of the mask as measured by photo-sensor 31. The calibration mask used to accumulate the data for these figures consisted of 6 micron wide Cartesian grid lines spaced 128 microns apart, as indicated by the cross-like shape of each graph.

The convolution of the data with the template reaches a maximum value when the template is most accurately aligned with the data. Thus, the location of the maximum value within the convolution data array identifies the best fit or location of the grid intersection within the data array. In this way, each mask intersection is precisely located. This method achieves a high precision in locating structures on the calibration mask by reducing random error in the measurement through the sampling and use of the large number of data points in the square scanned data array and template. The benefit of this method can be seen by visually appreciated by comparing the graph of the transparency array in FIG. 4, to the graph of the convolution in FIG. 6. The maximum peak in the convolution signal is much easier to identify than the peak in the raw transparency data. In practice, the precise maximum of the convolution peak is found by fitting a two dimensional quadratic equation to the convolution data in the vicinity of the peak. This procedure insures that local variations, and particular local maximums, in the convolution signal are not over-rated, and represents a further averaging of the data. The structure recognition method described here is useful and reliable when applied to a wide variety of mask structures, and is not limited to the particular example, intersecting grid lines, presented in this illustration.

Although the convolution method is an accepted tool for pattern recognition, no references have been found in the literature noting applications generally in film reading/recording systems, or particularly in CRT deflection system calibration. Although the method detailed above uses a Cartesian grid intersection as the recognized mask structure, it should be understood that other recognizable structures are within the scope of the method and invention. In some applications the mask structures may be spaced sufficiently close on the mask that scanning the entire local mask area with the light spot is preferred to scanning the region in a series of small arrays. In this case, recognition of the intersections can still rely on a convolution calculation, but the reference template would be modified to account for changes in the scanning area. Furthermore, in some applications it may be beneficial to reverse the polarity of the mask structure. In these instances the calibrated mask structure would comprise an opaque structure on a transparent background. The recognition process would remain unchanged, but the reference template would be modified to reflect the changes in the mask pattern.

In the embodiment illustrated in FIG. 1, mask calibration data is directly applied to calibrating the film plane geometry because the mask and the film lie in equivalent optical planes. This neglects the small uncorrected aberrations resulting from beamsplitter 18 and mirror 19, which differentiate the two optical paths.

In the CRT deflection calibration procedure, the mask recognition process is repeated for a number of mask structures within the accessible field of the projected CRT light spot. At some point during the calibration, the position of the translator is also measured either by interrogating position encoder 703, or by interpreting the identification codes on the mask structures, or by combining encoder information with mask calibration information. In either case, the data is used to complete the mapping of the CRT onto the film. The data are stored as corresponding pairs, which relate CRT deflection coordinates or commands to absolute positions on the film plane. After sufficient data has been accumulated, the data is processed by controller 13 to yield a mapping between the CRT and the film. As detailed above, the mapping can take the form of a series expansion as illustrated in FIG. 2. In this case, the data are used to calculate the expansion coefficients A(N),B(N) using standard least-squared fitting techniques. The validity of the coefficients A(N),B(N), and the accuracy of the derived relationship will depend on the choice of terms included in the expansion series. In general the choice of terms is made knowing the way in which the light spot is conveyed from the CRT to the film plane considering both the details of the CRT deflection and characteristics of the optical transmission path. The calibration mapping can alternately take the form of a look-up table. In this case, data for regions between measured data points is interpolated.

These coefficients could not be derived if we were limited to inspecting points on the periphery of the image. In order to accurately correct the image, many power series terms are necessary. In order to derive the coefficients of these terms, it is necessary to measure data points from all over the light emitting surface of the CRT/120. The raw deflection calibration data, as well as the expansion series coefficents are generally referred to as "correction parameters", since both data are used to reduce the error in the position of the light spot on the recording medium.

In all embodiments of the invention, the calibration data is used by controller 13 to accurately locate the image source light spot on the film. As data describing the color, density and position of each element of the printable image are recalled from a host computing system, or from memory, controller 13 uses the mapping data to calculate CRT coordinates from image coordinates. Given the desired location (X,Y)-film where the recording is to be exposed, controller 13 can calculate (X,Y)crt CRT deflection commands, assuming the translation stage holding the film has been properly located. These commands, applied to the CRT beam deflection system, then position the light spot on CRT faceplate 121 such that an image of the light spot falls at the desired point on the film as the CRT beam is turned on.

The CRT coordinates can be calculated from the image coordinates directly prior to the printing of each image point on the recording medium. Or, the deflection coordinates for a whole image section can be calculated and stored in local computer memory until needed. In these cases it is the position of the light spot which is calculated and possibly stored. The intensity characteristics of the image point remain unchanged.

In an alternate use of the deflection mapping data, the intensity characteristics of the image section can be modified while the position coordinates remain unchanged. In this case, the CRT light spot is scanned across the CRT faceplate during printing without modification to the deflection coordinates by the mapping data. The resulting scanned area, both on the CRT faceplate and on the recording medium, will be roughly square. This fact reflects the nominal linearity of the CRT deflection system and projection optics. As detailed above, this scanned area covers a region on the recording medium larger than that required to print a current section of the image. Rather than modify the position of each printed element of an image section, the mapping data is used in this method to modify the image section intensity characteristics so as to achieve the same effect as correcting the position data. The modification of the intensity data describing the image section effectively moves the image points while they are stored in computer memory before printing. This application of the calibration data to the image intensity rather than to the image geometry is advantageous due to the recent manufacture of specialized computer processor circuits, known variously as "warping" circuits, or "image resamplers." These circuits modify the image intensity data according to input parameters which are equivalent to the expansion series coefficients A(N),B(N) used to encode the deflection calibration mapping, as illustrated in FIG. 2. Thus, the same calibration data is applied in a different way to the image data to produce a correct and geometrically accurate printed image. These circuits perform the required transformation of the image data more quickly than standard computer circuits, and hence provide a valuable speed advantage for the printing/reading system.

The calibration of the deflection is performed periodically. As the translation stage moves from step to step, the mapping data must be modified to reflect the change in stage position. When the data is encoded as a series expansion, as in FIG. 2, only the first terms of the expansion A(0), and B(0) normally require modification. These can be updated modified using high resolution data from stage position encoder 703. Alternately, a single mask intersection can be recognized at each next stage location. The location of a single pattern serves to identify the (X,Y) location of the translator when combined with low resolution translator encoder information.

The use of the calibration mask, rather than high accuracy optical encoders, to identify the translator location significantly reduces the cost of the film reading/printing system. In some applications an accuracy of better than 1.0 micron is required in identifying the translator location. Although a relatively inexpensive photo-mask can be fabricated with this accuracy, translator mounted optical encoders with this accuracy are very expensive. Furthermore, the use of a calibrated mask removes the requirement that the X- and Y-axies of the translator mechanism be exactly perpendicular, because translator location is now referenced to the mask surface which does not reflect or share the misalignment of the translator axes. Optical encoders can not generally corrected for non-perpendicular translator axies.

The photographic system of the present invention can also be adapted to add a film reading capability. Film reading is the digitization of the density of a piece of either positive or negative film. Color film is ready by digitizing the density of the film with respect to the three primary colors at each point within the film image. The process of digitization usually involves casting a spot of light on a known point of the film and measuring the transmittance of light through the film at that point by placing a light sensor such as a photo-diode or photo-tube, behind the film plane. The transmittance is defined as the intensity of the transmitted light L divided by the initial light intensity Z. As shown in FIG. 1, reading sensor 17 is positioned behind film plane 162 within the photographic system 10. For this reading process, film holder 161 is transparent. In one embodiment, reading sensor 17 has the form and components of the embodiment of mask sensor 31 illustrated in FIG. 7.

In reading the density of a color print, the CRT beams located at a known point P on the CRT faceplate 121 correspond to a desired point P, on the film plane 162. The beam position (x, y) is accurately determined by the same feedback loop used in the printing process described above. C o l o r filter wheel 155, corresponding to the color being digitized, is placed in the light path before the light reaches either film plane 163 or sensor 172. Next, the beam L is either pulsed or turned on continuously. In either case, a measurement of the initial and transmitted beam intensity Z is made. These measurements are digitized and interpreted to yield a film density. This data is then transferred to a host system or otherwise appropriately stored. The CRT light beam L is moved to the next point to be digitized, and the process is repeated, including the insertion of the appropriate color filter in the sequence.

Prior art systems digitized film on a hypothetically orthogonal grid. Due to beam positioning errors, these grids were not in fact orthogonal, but somewhat deformed. Repeated digitization and reconstruction only served to increase the extent of distortion. The system of the present invention is not limited by such constraints. By using the enhanced feedback loop, film can be digitized repeatedly on an exact Cartesian coordinate grid.

In printing applications where a very high print resolution is required, the embodiment illustrated in FIG. 8 has a number of advantages over previously described systems. One application requiring very high resolution is the recording of computer generated holograms. In this case the projected CRT light spot has a diameter of less than 2 microns. To produce such a small spot, very short focal length lenses are normally placed very close to the recording medium. Referring to FIG. 1, where like numerals identify like components between FIGS. 1, 8, and 9, it is not feasible to place lens 15 arbitrarily close to both the mask and recording medium, due in part to the presence of beamsplitter 18 and mirror 19. In FIG. 8, lenses 501 and 502 are used to image the CRT light source onto respectively the film and the calibration mask. Light emitted form CRT 121 is directed by beamsplitter 503 into paths 510 and 511. Path 510 leads through color filters 520, shutter 530, and lens 501 to the recording medium 162. Light following path 511 is directed by mirror 504 through lens 502 onto the calibration mask 550. With the optical components placed according to FIG. 8, it is possible to achieve a close spacing between the lenses and the film and mask, and so achieve a large reduction in CRT spot size through demagnification.

Due to the use of two separate lenses 501 and 502, the film plane and the mask plane are no longer necessarily optically equivalent. Thus, as the mask is used to calibrate the deflection system, a further correction factor must be added to account for the this difference. Since both the calibration mask and the recording medium bear a fixed physical relationship to each other as they remain affixed to the translator stage, a calibrated, permanent transform relating positions on the film plane to positions on the mask plane can be measured and encoded during fabrication. This encoded mapping can take the form of a series expansion, or an interpolation data table. In either case, it is possible, using this mapping, to complete the calibration of CRT deflection coordinates in terms of film plane coordinates. With the present system, the ability to accurately read film also allows user or post-production calibration of this mapping. In place of film, a specially drawn photo-mask is put into the position of film plane 162 and held in place by holder 161. This photo-mask is essentially a calibration image. The film printer system 10 can then self-calibrate by reading the specially drawn photo-mask, and comparing the results to an accompanying data set of "expected" results from the calibration mode. This comparison then results in a revised calibration mapping algorithm.

A second, less obvious problem arises in the embodiment of FIG. 8 as the rest or undeflected position of the CRT beam wanders. Small changes in the undeflected beam position are expected with time, and as environmental conditions, such as temperature or magnetic field, vary. Independent of the deflection calibration information, these changes will cause image position errors unless another absolute beam position sensor is added, or unless the magnifications of lenses 501 and 502 are almost equal. This effect arises due to the use of independent lenses to image the light source onto the mask and the recording medium. The error in the CRT light spot position on the recording medium due to changes in the undeflected CRT beam position is roughly given by:

$$dX = dC * [(1/M1) - (1/M2)]$$

where:

dX = error in light spot position on the recording medium relative to the desired position dC = displacement of undeflected CRT beam from initial position M1 = magnification of lens 501 which images CRT faceplate 121 onto recording medium 162.

M2 = magnification of lens 502 which images CRT faceplate 121 onto calibration mask 550.

In practice, the focal lengths of lenses 501 and 502, and the distance between CRT faceplate 121 and beamsplitter 503 are adjusted during design and fabrication to insure that the magnifications M1 and M2 are equal. Thus, normal drift of the undeflected CRT beam position does not cause significant errors in print geometry.

Three other error sources can serve to reduce the precision of the printing/reading system.

First, changes in the temperature of the system will cause the components to expand or contract. For example, expansion of the mask, in particular, can result in errors in the printed image if the coefficient of expansion of the mask material is not matched to the expansion coefficient of the recording medium substrate. Although such matching is possible, it is easier in many applications to control the temperature of the printer mechanism either through thermal shielding, and by the use of active heating elements under supervision of controller 13. Proper control of these heating elements serves to maintain a constant temperature within the printer mechanism, reducing the effect of thermal expansion or contraction.

Discontinuous errors in deflection system response can also produce geometric errors not corrected by normal processing of the calibration data. Discontinuous behavior can arise in the digital-to-analog (D/A) converters used in the deflection control electronics. These effects can be reduced by using high resolution (D/A) converters, or by calibrating the converters during manufacture.

Position errors can arise if the translator rotates during motion. Especially in the embodiment illustrated in FIG. 8, changes in translator mechanism angle during movement will reduce the accuracy of the assumed "constant" transform between the film and mask planes, as described above. This effect can be eliminated by using a dual mask system, as illustrated in FIG. 9. In FIGS. 1, 5 and 6, like numerals identify like structures.

Referring to FIG. 9, recording medium 162 is flanked by two calibration mask systems, numbered 801 and 802. These function in an identical manner to the mask feedback system described for the embodiments in FIGS. 1 and 8. Using two masks allows the measurement and correction of stage rotation, since the two points determined by mask 801 and mask 802 determine the line and angle of the stage relative to the film.

In high resolution recording, exact focus of the CRT light spot onto the recording medium is necessary to achieve high resolution in the printed image. Out of focus images are blurry, and thus sacrifice detail. Focus assembly 560, and actuators 971 and 972, are used to locate the recording medium in proper focus. A detailed illustration of one embodiment of a focal mechanism is illustrated in FIG. 10.

Referring to FIG. 10, infrared emitting element 901 is comprised of an IR diode, or a small IR diode laser which emits infrared light towards lens 902, which concentrates the radiation onto fixed aperture 903. This aperture, as well as aperture 906 are formed by metal shield 904, which may be fabricated as an evaporated thin layer of aluminum on beamsplitter 905. The radiation proceeds along path 920 reaching lens 930 which focuses the radiation onto recording medium 940. In a preferred embodiment, lens 930 is the same element as lens 501 in FIGS. 8 and 9. The extended use of printing lens 501 as the focusing element in this mechanism insures that the relevant optical path is being tested for focus. The infrared radiation is scattered and reflected from the surface of the recording medium 940, and travels back along path 921 towards lens 930. This lens focuses the radiation toward aperture 903. Arriving at beamsplitter 905, some of the radiation is directed by the action of 905 to follow path 922 toward aperture 906, which lies in an optical plane equivalent to aperture 903, because both elements lie equally spaced from lens 930. Light transmitted through aperture 906 is received by infrared photo-sensor 950, which is sampled, by controller 13. In this way the controller 13 can measure the amount of radiation received through aperture 906. As illustrated in FIG. 10, the recording medium lies exactly in the focal plane of lens 30. For this reason, the light being focused on the medium, as well as some of the reflected light, are shown traveling the same optical path, although in opposite directions. When in perfect focus, the light returns precisely to the origin 903, or to the optically equivalent position 906.

If, however, recording surface 940 has moved to position which is not in the focal plane of the lens, such as that shown as dotted line 960, the light will be intercepted and scattered before reaching optimum focus. The size of the light scattering spot will grow, since the converging radiation cone has not fully converged. This enlarged scattering source will still be imaged back toward apertures 903 and 906 by lens 930. Since plane 960 is not in focus, the return radiation will be focused only in the vicinity of aperture 906, in particular. The loss of focus, and the growth of the scattering area will increase the size of the envelope of the return radiation as it reaches aperture 906. Since the diameter of aperture 906 is fixed for optimum focus, less radiation will be transmitted through the aperture, and photo-sensor 950 will provide a smaller response signal to controller 13.

To find the position of best focus, controller 13 provides a signal to actuators 971 and 972. These actuators can be fabricated as piezo elements, voice coils, or similar elements capable of moving the position of the recording medium in response to a control signal. Piezo elements are a preferred embodiment, since they provide a strong force, and reproducible actuation for a set control voltage. These elements are attached to mounting surface 980, which typically forms a part of the mechanical translator identified as element 704 in FIG. 1. As the position of the recording surface is thus moved by actuators 971 and 972 between planes 960 and 962, the signal provided by photosensor 950 will change, as described above. The maximum signal will occur as recording medium 940 passes through the focal plane of lens 930, and will decrease as the plane passes further to either side. Thus, controller 13 can identify a best focus condition by observing a maximum signal on photo-sensor signal line.

Infrared radiation is used as the probe in this mechanism since many photosensitive recording materials are insensitive to infrared radiation, and will not suffer accidental exposure during focus calibration. Thus, the position of the photosensitive emulsion relative to the position of best focus can be directly measured by this method.

The amount of light returning to aperture 906 may be small, depending on the intensity of source 901 and the infrared light scattering properties of material 940. To enhance the photosensor signal to noise ratio, the intensity of infrared source 901 can be modulated at a set frequency by controller 13. A frequency filter, matched to the drive frequency applied to source 901, and placed between sensor 950 and controller 13 can enhance the signal to noise performance of the sensor by selectively amplifying or passing only radiation modulated at the proper frequency. This filtering procedure is widely practiced in consumer remote control devices. The measurement and correction of the position of the recording medium for best focus can be practiced as the translator moves to each new image section during printing. Although only 2 actuators, 971 and 972, are illustrated in FIG. 10, at least three such elements are needed to support the plane of substrate 940. These are provided in applications of the invention.

Focal sensor assembly 560, and actuators 971 and 972 are thus useful in providing proper focus when the film substrate 940 is not flat, is not of the proper thickness, or has moved from the position of best focus due to thermal expansion or contraction of the film holder. In some applications of high resolution film printers, the ability to accurately print on purposely non-flat recording mediums can be of benefit. For example, computer generated holograms, which can be printed by means of the present invention, are used for laser optical components and as virtual imaging lenses. These computer holograms are normally restricted to flat substrates. The provision in the present invention for proper focus over curved or non-flat substrates eliminates this design constraint.

The capability of determining a best focus is equivalent to measuring the height of the recording medium. When piezo materials are used to fabricate actuators 971 and 972, the movement of substrate 940 is nominally proportional to the actuator signal supplied by controller 13. At a position of best focus, this signal is then linearly proportional to the height of the substrate. Thus, the translator position and the actuator signal form respectively the X, Y, and Z components of a three dimensional contour map of the substrate 940 as the substrate is moved by the translator to various locations. When measuring a contour map in accordance with this method, substrate 940 would be substituted for the recording medium which is normally located at this position. Substrate 940 may comprise a pre-recorded image when the recorded image data is encoded as height variations in the recording.

A device built in accordance with the invention disclosed in co-pending patent application Ser. No. 347,247, represented in form by the illustration in FIG. 1, has been used to print multiple-section 2.5 inch by 2.5 inch recordings. These recordings demonstrated a resolution of about 25 microns (0.001 inch), and a maximum geometric error of about 20 microns (0.0008 inches). Although it was feasible to increase the size of the recording by providing a longer translator motion, it proved commercially difficult, due to limitations in the embodiment, to significantly reduce the geometric error, or to increase the resolution of the recording.

The present invention improves upon this performance by restructuring the optical path, by substituting a more complex calibration mask composed of extended transparent structures, by locating these structures during deflection calibration using a more complex fitted convolution method, and by maintaining accurate focus of the CRT light spot on the recording emulsion. These improvements resulted in significantly enhanced performance, specifically demonstrating a resolution of better than 1.6 microns, and a maximum geometric error of less than 0.7 microns over a 2.5 inch by 2.5 inch recording. Further improvements in both resolution and geometric error can be expected using these modifications.

The ability of the present invention to read or digitize pre-recorded imagery is particularly useful when performed at this high resolution, because it allows digitization of high resolution images known as holograms. Holograms fabricated using laser light contain recorded information which can be extracted by this invention.

One measure of the utility of high resolution film printers is called the space-bandwidth product. This product rates the value of recording systems based on the maximum number of image points that can be printed on a single recording. This figure of merit is calculated, roughly, by dividing the image area by the area of the light spot used to expose the recording. For the present invention, using a 4 inch by 5 inch recording area and a 1.6 micron resolution, the space-bandwidth product is about 4 billion (4,000,000,000). This value is higher by at least a factor of 5 than that offered by competing technologies in the same manufacturing cost range of $4,000-$10,000.

Improvements incorporated in the film reading/recording system and method disclosed here significantly improve the resolution, geometric accuracy, and speed of the device over competing systems and previous embodiments.

An improved calibration mask pattern uses extended, transparent structures on the mask surface as targets for the calibration of the CRT deflection system. The extended area of the mask structures means that multiple measurements can be used to identify the exact location of the structure in terms of CRT or image source coordinates. This reduces the error in the calibration data, and results in a more accurate printed image or recording.

Identification data written on the mask near each mask structure can be read by a controller using the image source light spot as a probe. These codes identify each structure and remove the redundancy between otherwise identical features. The identification codes can also be used to address or reference correction data, measured after the fabrication of each mask, which indicates the displacement or deviation of each structure from an expected or ideal location. This improves the accuracy of data accumulated during the calibration of the deflection system, and results in a recording with improved geometric accuracy.

An improved method is used to locate structures on the calibration mask during calibration of the CRT deflection system. Data measuring the transparency of the calibration mask is accumulated in a scanned array. This data is convolved with a predetermined template which represents the expected form of the data. The convolution data, also known as the recognition signal, better indicates the placement or location of the mask structure within the scanned array. This results in reduced error in the CRT calibration data, and a better geometric accuracy in the recorded image.

An improved feedback photo-sensor geometry, in which the light collection elements used with the sensor always bears a fixed position relative to the lens used for accumulating calibration mask data, increases the size of the recording medium which can be used with the present invention. With this improvement, the feedback sensor need only be able to accept light from an area equivalent in size to one of the image sections used in the recording of a complete image. With this improvement, the size of the recorded image is not limited to the effective area of the feedback photo-sensor.

An improved optical layout, illustrated in FIG. 8, allows placement of image projection lenses closer to the recording medium and calibration mask. This allows a higher demagnification of the CRT light spot as projected onto the recording medium. The reduced size of the light spot used to expose the recording medium provides significant benefit by directly increasing the resolution of the reading/recording system.

An improved optical layout, illustrated in FIG. 9, uses two calibration masks and lenses during the calibration of the CRT deflection system, and during the measurement of the translation stage position. The two mask system allows the measurement and elimination of errors in the CRT deflection calibration caused by physical rotation of the translation stage as it moves the recording medium through the step and repeat motion required while printing images in sections. This improves the geometric accuracy of the recorded image, particularly in larger recordings.

The introduction of a system and method for insuring that the recording medium lies in or close to the focal plane of the recording lens insures that variations in the thickness of the recording medium, or other effects, will not blur the recorded image. This improvement significantly increases the resolution of the film reading-/recording system when used to record very high resolution imagery such as computer generated holograms by reducing the blurring effects of poor focus.

Although the present invention has been described with reference to preferred embodiments, it should be understood by those in the art that various changes or substituted equivalents are within the scope of the invention. It is therefore intended that the invention not be limited to the particular embodiments as application disclosed herein for practicing the invention and includes all embodiments covered within the scope of the claims. It should be understood that the reading system described above contains the same elements as the recording system.

I claim:

1. An apparatus for recording an image onto a light recording medium by sequentially recording a plurality of sections onto the light recording medium which constitute the image comprising:
   a light source which emits light at a position which is movable over a light emitting area of the light source controlled by a controller, the position of the light being subject to deviation from a desired position on the light emitting area of the light source which corresponds to a position to be recorded on the recording medium which has recording position coordinates;
   a translator having controllable positions for moving the recording medium relative to a light source during the recording of the plurality of sections of the image;
   a light transmitting means disposed between the light source and the recording medium for transmitting the light from the light source to the recording medium; and
   a light position sensor having a target area having a plurality of apertures including at least one line segment coupled to light emitted from a plurality of positions within the light emitting area of the light source used for recording for detecting the position of the light intersecting the target area of the sensor from the light emitting area of the light source and generating at least one signal dependent upon the light intersecting the target area; and wherein
   the controller, responsive to the at least one signal, produces at least one correction parameter, sequentially controls the recording of the sections to record the image by controlling the position of the light on the light emitting area of the light source as a function of the at least one correction parameter during the recording of each section to cause the light to move to coordinates on the light emitting area of the light source to cause the light to intersect the recording medium at the recording position coordinates and controls the position of the translator for the recording of each section.

2. An apparatus in accordance with claim 1 wherein:
   a plurality of apertures each contains a line segment.

3. An apparatus in accordance with claim 2 wherein:
   the plurality of apertures each contain intersecting line segments.

4. An apparatus in accordance with claim 2 wherein:
   the plurality of apertures each contain nonintersecting line segments.

5. An apparatus in accordance with claim 1 wherein:
   a plurality of apertures each are a ring.

6. An apparatus in accordance with claim 1 wherein:
   the light source emits light from the light emitting area to intersect an area on the target area containing at least one line segment; and
   the controller stores a sensed array of data points, which are correlated with the area of the target containing the at least one line segment, representing an intensity of the light sensed by the sensor at each data point and processes the sensed array of data points to produce the at least one correction parameter.

7. An apparatus in accordance with claim 6 wherein:
   the controller convolves a corresponding stored array of data points representing a structure of the at least one line with the sensed data points to produce a convolution array of data points, processes the convolution array to detect a maximum magnitude and generates the at least correction parameter as a function of the maximum magnitude.

8. An apparatus in accordance with claim 1 wherein:
   the target area is a mask containing the apertures with light from the light emitting area intersecting one side of the target area; and further comprising
   a photosensor spaced apart from a side opposed to the side on which light intersects the mask for generating a signal proportional to the intensity of light passing through the apertures.

9. An apparatus in accordance with claim 6 wherein:
   the target area is a mask containing the apertures with light from the light emitting area intersecting one side of the target area; and further comprising
   a photosensor spaced apart from a side opposed to the side on which light intersects the mask for generating a signal proportional to the intensity of light passing through the apertures.

10. An apparatus in accordance with claim 7 wherein:
    the target area is a mask containing the apertures with light from the light emitting area intersecting one side of the target area; and further comprising
    a photosensor spaced apart from a side opposed to the side on which light intersects the mask for generating a signal proportional to the intensity of light passing through the apertures.

11. An apparatus in accordance with claim 1 wherein the light transmitting means comprises:
    an optical transmission path coupling light from the light emitting area to the recording medium and to the light position sensor including a beam splitter splitting light emitted from the light emitting area into a first light beam and a second light beam, a first lens focusing the first light beam onto the recording medium and a second lens focusing the second light beam onto the light position sensor assembly.

12. An apparatus in accordance with claim 6 wherein the light transmitting means comprises:
an optical transmission path coupling light from the light emitting area to the recording medium and to the light position sensor including a beam splitter splitting light emitted from the light emitting area into a first light beam and a second light beam, a first lens focusing the first light beam onto the recording medium and a second lens focusing the second light beam onto the light position sensor assembly.

13. An apparatus in accordance with claim 7 wherein the light transmitting means comprises:
an optical transmission path coupling light from the light emitting area to the recording medium and to the light position sensor including a beam splitter splitting light emitted from the light emitting area into a first light beam and a second light beam, a first lens focusing the first light beam onto the recording medium and a second lens focusing the second light beam onto the light position sensor.

14. An apparatus in accordance with claim 8 wherein the light transmitting means comprises:
an optical transmission path coupling light from the light emitting area to the recording medium and to the light position sensor including a beam splitter splitting light emitted from the light emitting area into a first light beam and a second light beam, a first lens focusing the first light beam onto the recording medium and a second lens focusing the second light beam onto the light position sensor.

15. An apparatus in accordance with claim 9 wherein the light transmitting means comprises:
an optical transmission path coupling light from the light emitting area to the recording medium and to the light position sensor including a beam splitter splitting light emitted from the light emitting area into a first light beam and a second light beam, a first lens focusing the first light beam onto the recording medium and a second lens focusing the second light beam onto the light position sensor.

16. An apparatus in accordance with claim 10 wherein the light transmitting means comprises:
an optical transmission path coupling light from the light emitting area to the recording medium and to the light position sensor including a beam splitter splitting light emitted from the light emitting area into a first light beam and a second light beam, a first lens focusing the first light beam onto the recording medium and a second lens focusing the second light beam onto the light position sensor.

17. An apparatus in accordance with claim 8 further comprising:
a position encoder associated with the translator for providing the controller with position coordinates of the translator with a first level of resolution; and wherein
the recording medium and the mask are mounted on the translator;
the light emitting area projects light onto the mask to cause the photosensor to output signals in response to light passing through an aperture intersecting the photosensor; and
the controller determines coordinates of the position of the translator with a second higher level of resolution than the first level of resolution in response to signals outputted by the photosensor and a position of the light on the light emitting area of the light source.

18. An apparatus in accordance with claim 9 further comprising:
a position encoder associated with the translator for providing the controller with position coordinates of the translator with a first level of resolution; and wherein
the recording medium and the mask are mounted on the translator;
the light emitting area projects light onto the mask to cause the photosensor to output signals in response to light passing through an aperture intersecting the photosensor; and
the controller determines coordinates of the position of the translator with a second higher level of resolution than the first level of resolution in response to signals outputted by the photosensor and a position of the light on the light emitting area of the light source.

19. An apparatus in accordance with claim 10 further comprising:
a position encoder associated with the translator for providing the controller with position coordinates of the translator with a first level of resolution; and wherein
the recording medium and the mask are mounted on the translator;
the light emitting area projects light onto the mask to cause the photosensor to output signals in response to light passing through an aperture intersecting the photosensor; and
the controller determines coordinates of the position of the translator with a second higher level of resolution than the first level of resolution in response to signals outputted by the photosensor and a position of the light on the light emitting area of the light source.

20. An apparatus in accordance with claim 1 further comprising:
optically readable data associated with the apertures which provide information used for specifying a position of at least one of the apertures in the target area.

21. An apparatus in accordance with claim 20 wherein:
the optically readable data associated with the apertures occur periodically across the target area along at least one coordinate axis with each data specifying a position of an associated aperture.

22. An apparatus in accordance with claim 21 wherein:
an optically readable data is associated with each aperture for specifying the position of the associated aperture.

23. An apparatus in accordance with claim 6 further comprising:
optically readable data associated with the apertures which provide information used for specifying a position of at least one of the apertures in the target area.

24. An apparatus in accordance with claim 23 wherein:
the optically readable data associated with the apertures occur periodically across the target area along at least one coordinate axis with each data specifying a position of an associated aperture.

25. An apparatus in accordance with claim 24 wherein:
   an optically readable data is associated with each aperture for specifying the position of the associated aperture.

26. An apparatus in accordance with claim 7 further comprising:
   optically readable data associated with the apertures which provide information used for specifying a position of at least one of the apertures in the target area.

27. An apparatus in accordance with claim 26 wherein:
   the optically readable data associated with the apertures occur periodically across the target area along at least one coordinate axis with each data specifying a position of an associated aperture.

28. An apparatus in accordance with claim 27 wherein:
   an optically readable data is associated with each aperture for specifying the position of the associated aperture.

29. An apparatus in accordance with claim 8 further comprising:
   optically readable data associated with the apertures which provide information used for specifying a position of at least one of the apertures in the target area.

30. An apparatus in accordance with claim 29 wherein:
   the optically readable data associated with the apertures occur periodically across the target area along at least one coordinate axis with each data specifying a position of an associated aperture.

31. An apparatus in accordance with claim 30 wherein:
   an optically readable data is associated with each aperture for specifying the position of the associated aperture.

32. An apparatus in accordance with claim 11 further comprising:
   optically readable data associated with the apertures which provide information used for specifying a position of at least one of the apertures in the target area.

33. An apparatus in accordance with claim 32 wherein:
   the optically readable data associated with the apertures occur periodically across the target area along at least one coordinate axis with each data specifying a position of an associated aperture.

34. An apparatus in accordance with claim 32 wherein:
   an optically readable data is associated with each aperture for specifying the position of the associated aperture.

35. An apparatus in accordance with claim 17 further comprising:
   optically readable data associated with the apertures which provide information used for specifying a position of at least one of the apertures in the target area.

36. An apparatus in accordance with claim 35 wherein:
   the optically readable data associated with the apertures occur periodically across the target area along at least one coordinate axis with each data specifying a position of an associated aperture.

37. An apparatus in accordance with claim 35 wherein:
   an optically readable data is associated with each aperture for specifying the position of the associated aperture.

38. An apparatus in accordance with claim 1 further comprising:
   a focusing system for varying a position of the recording medium in a direction parallel to the direction of incident light for positioning the recording medium at a best focused position with respect to the light source.

39. An apparatus in accordance with claim 38 wherein:
   the focusing system varies the position of the recording medium with respect to the direction of incident light until light returned from the recording medium intersecting a focusing photosensitive element has a minimum area.

40. An apparatus in accordance with claim 39 wherein the focusing system further comprises:
   means for moving the recording medium in the direction parallel to the direction of incident light in response to control signals produced in response to a focus signal produced by the focusing photosensitive element.

41. An apparatus in accordance with claim 6 further comprising:
   a focusing system for varying a position of the recording medium in a direction parallel to the direction of incident light for positioning the recording medium at a best focused position with respect to the light source.

42. An apparatus in accordance with claim 41 wherein:
   the focusing system varies the position of the recording medium with respect to the direction of incident light until light returned from the recording medium intersecting a focusing photosensitive element has a minimum area.

43. An apparatus in accordance with claim 42 wherein the focusing system further comprises:
   means for moving the recording medium in the direction parallel to the direction of incident light in response to control signals produced in response to a focus signal produced by the focusing photosensitive element.

44. An apparatus in accordance with claim 7 further comprising:
   a focusing system for varying a position of the recording medium in a direction parallel to the direction of incident light for positioning the recording medium at a best focused position with respect to the light source.

45. An apparatus in accordance with claim 44 wherein:
   the focusing system varies the position of the recording medium with respect to the direction of incident light until light returned from the recording medium intersecting a focusing photosensitive element has a minimum area.

46. An apparatus in accordance with claim 45 wherein the focusing system further comprises:
   means for moving the recording medium in the direction parallel to the direction of incident light in response to control signals produced in response to a focus signal produced by the focusing photosensitive element.

47. An apparatus in accordance with claim 8 further comprising:
  a focusing system for varying a position of the recording medium in a direction parallel to the direction of incident light for positioning the recording medium at a best focused position with respect to the light source.

48. An apparatus in accordance with claim 47 wherein:
  the focusing system varies the position of the recording medium with respect to the direction of incident light until light returned from the recording medium intersecting a focusing photosensitive element has a minimum area.

49. An apparatus in accordance with claim 48 wherein the focusing system further comprises:
  means for moving the recording medium in the direction parallel to the direction of incident light in response to control signals produced in response to a focus signal produced by the focusing photosensitive element.

50. An apparatus in accordance with claim 11 further comprising:
  a focusing system for varying a position of the recording medium in a direction parallel to the direction of incident light for positioning the recording medium at a best focused position with respect to the light source.

51. An apparatus in accordance with claim 50 wherein:
  the focusing system varies the position of the recording medium with respect to the direction of incident light until light returned from the recording medium intersecting a focusing photosensitive element has a minimum area.

52. An apparatus in accordance with claim 51 wherein the focusing system further comprises:
  means for moving the recording medium in the direction parallel to the direction of incident light in response to control signals produced in response to a focus signal produced by the focusing photosensitive element.

53. An apparatus in accordance with claim 17 further comprising:
  a focusing system for varying a position of the recording medium in a direction parallel to the direction of incident light for positioning the recording medium at a best focused position with respect to the light source.

54. An apparatus in accordance with claim 53 wherein:
  the focusing system varies the position of the recording medium with respect to the direction of incident light until light returned from the recording medium intersecting a photosensitive element has a focusing minimum area.

55. An apparatus in accordance with claim 54 wherein the focusing system further comprises:
  means for moving the recording medium in the direction parallel to the direction of incident light in response to control signals produced in response to a focus signal produced by the focusing photosensitive element.

56. An apparatus in accordance with claim 20 further comprising:
  a focusing system for varying a position of the recording medium in a direction parallel to the direction of incident light for positioning the recording medium at a best focused position with respect to the light source.

57. An apparatus in accordance with claim 56 wherein:
  the focusing system varies the position of the recording medium with respect to the direction of incident light until light returned from the recording medium intersecting a focusing photosensitive element has a minimum area.

58. An apparatus in accordance with claim 57 wherein the focusing system further comprises:
  means for moving the recording medium in the direction parallel to the direction of incident light in response to control signals produced in response to a focus signal produced by the focusing photosensitive element.

59. An apparatus in accordance with claim 1 wherein:
  during recording of a section the light position sensor receives light passing through a number of apertures which is less than the plurality of apertures.

60. An apparatus in accordance with claim 11 wherein the light transmitting means further comprises:
  an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
  the controller processes signals from the light sensors to correct for a position error.

61. An apparatus for reading previously recorded information disposed on a recording medium comprising:
  a light source which emits light at a position which is movable over a light emitting area of the light source controlled by a controller, the position of the light being subject to deviation from a desired position on the light emitting area of the light source which corresponds to a position to be read on the recording medium which has recorded position coordinates;
  a translator having controllable positions for moving the recording medium relative to a light source during the reading of the recorded information;
  a light transmitting means disposed between the light source and the recording medium for transmitting the light from the light source to the recording medium; and
  a light position sensor having a target area having a plurality of apertures including at least one line segment coupled to light emitted from a plurality of positions within the light emitting area of the light source used for reading for detecting the position of the light intersecting the target area of the sensor from the light emitting area of the light source and generating at least one signal dependent upon the light intersecting the target area; and wherein
  the controller, responsive to the at least one signal, produces at least one correction parameter, sequentially controls reading of the information in sections by controlling the position of the light on the light emitting area of the light source as a function of the at least one correction parameter during the reading to cause the light to move to coordinates on the light emitting area of the light source to cause the light to intersect the recording medium at the recorded position coordinates and controls the position of the translator for the reading of each section.

62. An apparatus in accordance with claim 61 wherein:
the target area is a mask containing the apertures with light from the light emitting area intersecting one side of the target area; and further comprising
a photosensor spaced apart from a side opposed to the side on which light intersects for generating a signal proportional to the intensity of light passing through the apertures.

63. An apparatus in accordance with claim 62 further comprising:
a focusing system for varying a position of the recording medium in a direction parallel to the direction of incident light for positioning the recording medium at a best focused position with respect to the light source.

64. An apparatus in accordance with claim 63 further comprising:
the focusing system varies the position of the recording medium with respect to the direction of incident light until light returned from the recording medium intersecting a focusing photosensitive element has a minimum area.

65. An apparatus in accordance with claim 64 further comprising:
means for moving the recording medium in the direction parallel to the direction of incident light in response to control signals produced in response to a focus signal produced by the focusing photosensitive element.

66. An apparatus in accordance with claim 62 wherein the light transmitting medium further comprises:
an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
the controller processes signals from the light sensors to correct for a position error.

67. An apparatus in accordance with claim 61 wherein the light transmitting means further comprises:
an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
the controller processes signals from the light sensors to correct for a position error.

68. An apparatus in accordance with claim 62 wherein the light transmitting means further comprises:
an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
the controller processes signals from the light sensors to correct for a position error.

69. An apparatus in accordance with claim 63 wherein the light transmitting means further comprises:
an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
the controller processes signals from the light sensors to correct for a position error.

70. An apparatus in accordance with claim 64 wherein the light transmitting means further comprises:
an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
the controller processes signals from the light sensors to correct for a position error.

71. An apparatus in accordance with claim 65 wherein the light transmitting means further comprises:
an optical transmission path coupling light from the light emitting area to the recording medium and to the light position sensor and to another light position sensor including a first beam splitter splitting light emitted from the light emitting area into a first light beam and a second light beam, a first lens focusing the first light beam onto the light position sensor, a second beam splitter splitting the second light beam into the third and fourth light beams, a second lens focusing the third light beam onto the recording medium and a third lens focusing the fourth light beam onto the another light position sensor; and wherein
the controller processes signals from the light sensors to correct for a position error.

* * * * *